United States Patent
Liu et al.

(10) Patent No.: US 11,943,081 B2
(45) Date of Patent: Mar. 26, 2024

(54) METHOD OF RECEIVING A TRANSMITTED SIGNAL OVER A TIME-VARYING CHANNEL AND RECEIVER THEREOF

(71) Applicants: NANYANG TECHNOLOGICAL UNIVERSITY, Singapore (SG); SOUTHWEST JIAOTONG UNIVERSITY, Sichuan (CN)

(72) Inventors: Xiaobei Liu, Singapore (SG); Kushal Anand, Singapore (SG); Yong Liang Guan, Singapore (SG); Pingzhi Fan, Sichuan (CN)

(73) Assignees: Nanyang Technological University, Singapore (SG); Southwest Jiaotong University, Sichuan (CN)

( * ) Notice: Subject to any disclaimer, the term of this patent is extended or adjusted under 35 U.S.C. 154(b) by 71 days.

(21) Appl. No.: 17/770,984

(22) PCT Filed: Oct. 22, 2020

(86) PCT No.: PCT/SG2020/050605
§ 371 (c)(1),
(2) Date: Apr. 21, 2022

(87) PCT Pub. No.: WO2021/080510
PCT Pub. Date: Apr. 29, 2021

(65) Prior Publication Data
US 2022/0368569 A1    Nov. 17, 2022

(30) Foreign Application Priority Data
Oct. 22, 2019   (SG) .......................... 10201909843V

(51) Int. Cl.
*H04L 25/02*    (2006.01)
*H04L 25/03*    (2006.01)

(52) U.S. Cl.
CPC ........ *H04L 25/0224* (2013.01); *H04L 25/022* (2013.01); *H04L 25/03292* (2013.01); *H04L 2025/03433* (2013.01)

(58) Field of Classification Search
CPC ............... H04L 25/0224; H04L 25/022; H04L 25/03292; H04L 2025/03433;
(Continued)

(56) References Cited

U.S. PATENT DOCUMENTS 7,136,111 B2   11/2006  Kim
8,199,861 B1 *  6/2012  Karkhanechi ....... H04L 25/0204
                                                 375/340
(Continued)

FOREIGN PATENT DOCUMENTS

CN     1496107 A    5/2004
CN   102158459 A    8/2011
(Continued)

OTHER PUBLICATIONS

Machine Translation of CN-108156101-A. (Year: 2023).*
(Continued)

*Primary Examiner* — Jean B Corrielus
(74) *Attorney, Agent, or Firm* — Seed IP Law Group LLP

(57) ABSTRACT

There is provided a method of receiving a transmitted signal over a time-varying channel. The method includes: obtaining a received symbol signal in frequency domain based on the transmitted signal; performing a first channel estimation based on the received symbol signal to obtain a plurality of first estimated BEM coefficients; performing a first equalization based on the received symbol signal and the plurality of first estimated BEM coefficients to obtain a plurality of first detected source symbols; and performing one or more rounds of a second channel estimation and a second equalization. Each round includes: performing the second channel
(Continued)

estimation based on the received symbol signal and a plurality of detected source symbols to obtain a plurality of second estimated BEM coefficients; performing interference removal based on the received symbol signal, the plurality of detected source symbols and the plurality of second estimated BEM coefficients to obtain an interference reduced symbol signal infrequency domain; and performing the second equalization based on the interference reduced symbol signal and the plurality of second estimated BEM coefficients to obtain a plurality of second detected source symbols. There is also provided a corresponding receiver, and a system for wireless communication over a time-varying channel including the receiver.

20 Claims, 15 Drawing Sheets

(58) Field of Classification Search
CPC . H04L 25/025; H04L 25/0222; H04L 25/024; H04L 25/0242; H04L 25/03305
See application file for complete search history.

(56) References Cited

U.S. PATENT DOCUMENTS

| | | | |
|---|---|---|---|
| 8,218,613 B2* | 7/2012 | Wu | H04L 25/0228 375/232 |
| 8,335,284 B1 | 12/2012 | Lee et al. | |
| 8,737,499 B2* | 5/2014 | Sikri | H04B 7/005 370/208 |
| 8,824,534 B2 | 9/2014 | Hrycak et al. | |
| 2008/0219371 A1 | 9/2008 | Hong et al. | |
| 2010/0166126 A1* | 7/2010 | Matsumura | H04L 25/022 375/350 |
| 2011/0013684 A1 | 1/2011 | Semenov et al. | |
| 2011/0173508 A1* | 7/2011 | Wehinger | H04L 25/067 375/232 |
| 2017/0094665 A1 | 3/2017 | Sha et al. | |
| 2019/0116065 A1 | 4/2019 | Sung et al. | |
| 2022/0217019 A1* | 7/2022 | Levinbrook | H04L 5/0048 |

FOREIGN PATENT DOCUMENTS

| | | | |
|---|---|---|---|
| CN | 103281272 A | 9/2013 | |
| CN | 105024956 A | 11/2015 | |
| CN | 105827274 A | 8/2016 | |
| EP | 1968268 A2 * | 9/2008 | H04L 25/022 |
| WO | 2007/068737 A2 | 6/2007 | |

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211, V13.2.0, Technical Specification, Jun. 2016, 170 pages.
Anand et al., "Pilot Design for BEM-based Channel Estimation in Doubly Selective Channel," *IEEE International Conference on Communication Systems (ICCS)*, Dec. 2018, 15 pages.
Barhumi et al., "Equalization for OFDM Over Doubly Selective Channels," *IEEE Transactions on Signal Processing* 54(4): 1445-1458, Apr. 2006.
Barhumi et al., "Estimation and Direct Equalization of Doubly Selective Channels," Hindawi Publishing Corporation, *EURASIP Journal on Applied Signal Processing*, vol. 2006, Article ID 62831, 15 pages.
Barhumi et al., "MLSE and MAP Equalization for Transmission Over Doubly Selective Channels," *IEEE Transactions on Vehicular Technology* 58(8):4120-4128, Oct. 2009.
Barhumi et al., "Time-Varying FIR Equalization for Doubly Selective Channels," *IEEE Transactions on Wireless Communications* 4(1):202-214, Jan. 2005.
Chen et al., "Adaptive MLSE Equalizers with Parametric Tracking for Multipath Fast-Fading Channels," *IEEE Transactions on Communications* 49(4):655-663, Apr. 2001.
Cheng et al., "Channel Estimation for OFDM Systems over Doubly Selective Channels: A Distributed Compressive Sensing Based Approach," *IEEE Transactions on Communcations* 61(10):4173-4185, Oct. 2013.
Cong et al., "On SOVA for Nonbinary Codes," *IEEE Communications Letters* 3(12):641-643, Dec. 1999.
Davis et al., "Joint MAP Equalization and Channel Estimation for Frequency-Selective and Frequency-Flat Fast-Fading Channels," *IEEE Transactions on Communications* 49(12):2106-2114, Dec. 2001.
Flanagan et al., "Iterative Channel Estimation, Equalization, and Decoding for Pilot- Symbol Assisted Modulation Over Frequency Selective Fast Fading Channels," *IEEE Transactions on Vehicular Technology* 56(4):1661-1670, Jul. 2007.
Giannakis et al., "Basis Expansion Models and Diversity Techniquies for Blind Identification and Equalization of Time-Varying Channels," *Proceedings of the IEEE* 86(10):1969-1986, Oct. 1998.
Gong et al., "Block Distributed Compressive Sensing-Based Doubly Selective Channel Estimation and Pilot Design for Large-Scale MIMO Systems," *IEEE Transactions on Vehicular Technology* 66(10):9149-9161, Oct. 2017.
Gong et al., "Block Pilot Based Channel Estimation and High-Accuracy Signal Detection for GSM-OFDM Systems on High-Speed Railways," IEEE Transactions on Vehicular Technology 67(12):11525-11536, Dec. 2018.
Hagenauer, "A Viterbi Algorithm with Soft-Decision Outputs and its Applications," *Proc. Globecom*, pp. 1680-1686, Nov. 1989.
Haykin, *Adaptive Filter Theory*, Fifth Edition, Pearson, 2014.
He et al., "On Doubly Selective Channel Estimation Using Superimposed Training and Discrete Prolate Spheroidal Sequences," *IEEE Transactions on Signal Processing* 56(7):3214-3228, Jul. 2008.
Hijazi et al., "Polynomial Estimation of Time-Varying Multipath Gains With Intercarrier Interference Mitigation in OFDM Systems," *IEEE Transactions on Vehicular Technology* 58(1): 140-151, Jan. 2009.
Hu et al., "A New Sparse Channel Estimation and Tracking Method for Time-Varying OFDM Systems," *IEEE Transactions on Vehicular Technology* 62(9): 4648-4653, Nov. 2013.
Kim et al., "Turbo Equalization for Doubly-Selective Fading Channels Using Nonlinear Kalman Filtering and Basis Expansion Models," *IEEE Transactions on Wireless Communications* 9(6):2076-2087, Jun. 2010.
Leus, "On The Estimation Of Rapidly Time-Varying Channels," IEEE European Signal Processing Conference (EUSIPCO), Sep. 2004, pp. 2227-2230.
Li et al., "Fast Time-Varying Channel Estimation Method For LTE SC-FDMA Systems," 2014 IEEE International Conference on Acoustic, Speech and Signal Processing (ICASSP), 5 pages.
Liu et al., "Low-Complexity Single-Channel Blind Separation of Co-Frequency Coded Signals," IEEE Communications Letters 22(5):990-993, May 2018.
Liu et al., "Single-Channel Blind Separation of Co-Frequency PSK Signals with Unknown Carrier Frequency Offsets," Milcom 2017 Track 1—Waveforms and Signal Processing, 6 pages.
Ma et al., "Maximum-Diversity Transmissions Over Doubly Selective Wireless Channels," *IEEE Transactions on Information Theory* 49(7): 1832-1840, Jul. 2003.
Ma et al., "Optimal Training for Block Transmissions Over Doubly Selective Wireless Fading Channels," *IEEE Transactions on Signal Processing* 51(5):1351-1366, May 2003.
Otnes et al., "Iterative Channel Estimation for Turbo Equalization of Time-Varying Frequency-Selective Channels," *IEEE Transactions on Wireless Communications* 3(6):1918-1923, Nov. 2004.
Qu et al., "On the Estimation of Doubly-Selective Fading Channels," IEEE Transactions on Wireless Communications 9(4):1261-1265, Apr. 2010.

(56) References Cited

OTHER PUBLICATIONS

Raheli et al., "Per-Survivor Processing: A General Approach to MLSE in Uncertain Environments," *IEEE Transactions on Communications* 43(2/3/4):354-364, Feb./Mar./Apr. 1995.
Robertson et al., "A Comparison of Optimal and Sub-Optimal MAP Decoding Algorithms Operating in the Log Domain," *Proc. Int. Conf. Communications*, Jun. 1995, pp. 1009-1013.
Rossi et al., "Slepian-Based Two-Dimensional Estimation of Time-Frequency Variant MIMO-OFDM Channels," *IEEE Signal Processing Letters* 15, 2008, pp. 21-24.
Sheng et al., "Pilot Optimization for Estimation of High-Mobility OFDM Channels," *IEEE Transactions on Vehicular Technology* 66(10):8795-8806, Oct. 2017.
Tang et al., "Pilot-Assisted Time-Varying Channel Estimation for OFDM Systems," *IEEE Transactions of Signal Processing* 55(5):2226-2238, May 2007.
Tang et al., "Time-Multiplexed Training for Time-Selective Channels," *IEEE Signal Processing Letters* 14(9):585-588, Sep. 2007.
Tauböck et al., "Compressive Estimation of Doubly Selective Channels in Multicarrier Systems: Leakage Effects and Sparsity-Enhancing Processing," *IEEE Journal of Selected Topics in Signal Processing* 4(2):255-271, Apr. 2010.
Tsatsanis et al., "Equalization of Rapidly Fading Channels: Self-Recovery Methods," *IEEE Transactions on Communications* 44(5):619-630, May 1996.
Tugnait et al., "Doubly Selective Channel Estimation Using Exponential Basis Models and Subblock Tracking," IEEE Transactions on Signal Processing 58(3):1275-1289, Mar. 2010.
Tugnait et al., "Doubly-Selective Channel Estimation Using Data-Dependent Superimposed Training and Exponential Basis Models," IEEE Transactions on Wireless Communications 6(11):3877-3883, Nov. 2007.
Viterbi, "Error Bounds for Convolutional Codes and an Asymptotically Optimum Decoding Algorithm," *IEEE Transactions on Information Theory IT*—13(2):260-269, Apr. 1967.
Whitworth et al., "Optimized Training and Basis Expansion Model Parameters for Doubly-Selective Channel Estimation," *IEEE Transactions on Wireless Communications* 8(3):1490-1498, Mar. 2009.
Wu et al., "A Survey on High Mobility Wireless Communications: Challenges, Opportunities and Solutions," Digital Object Identifier 10.1109/ACCESS.2016.2518085, vol. 4, Mar. 4, 2016, pp. 450-476.
Wu et al., "Single-Channel Blind Source Separation of Co-Frequency Overlapped GMSK Signals Under Constant-Modulus Constraints," *IEEE Communications Letters* 20(3):486-489, Mar. 2016.
Yang et al., "Wavelet BEM Based Channel Estimation over Rapidly Time-Varying Channels," 2013 IEEE WCNC Workshop on Convergence of Broadcasting and Broadband Communications, pp. 71-75.
Zemen et al., "Iterative Joint Time-Variant Channel Estimation and Multi-User Detection for MC-CDMA," *IEEE Transactions on Wireless Communications* 5(6):1469-1478, Jun. 2006.
Zemen et al., "Iterative Time-Variant Channel Estimation for 802.11p Using Generalized Discrete Prolate Spheroidal Sequences," IEEE Transactions on Vehicular Technology 61(3):1222-1233, Mar. 2012.
Zemen et al., "Minimum-Energy Band-Limited Predictor With Dynamic Subspace Selection for Time-Variant Flat-Fading Channels," *IEEE Transactions on Signal Processing* 55(9):4534-4548, Sep. 2007.
Zemen et al., "Time-Variant Channel Estimation Using Discrete Prolate Spheroidal Sequences," IEEE Transactions on Signal Processing 53(9):3597-3607, Sep. 2005.
Partial Supplementary European Search Report for Application No. EP 20879921.3 dated Oct. 17, 2023, 15 pages.
Office Action in Chinese Patent Application No. 202080073253.5 dated Sep. 7, 2023, 22 pages.
Zhang, "Study on Channel Estimation and Signal Detection Technology of MIMO-OFDM Systems in Fast Time-Varynig Channels", College of Communication Engineering of Chongqing University, Chongqing, China, Apr. 2015, 76 pages.
Chen, D. et al., "Novel estimation and equalization of time-variant channels for OFDM system", Journal of Xidian University, vol. 37, No. 6, Dec. 2010, 6 pages.
Lu, D. et al., "Multi-user detection algorithm in the LEO satellite random access system", Journal of Xidian University, vol. 45, No. 5, Oct. 2018, 6 pages.

\* cited by examiner

METHOD OF RECEIVING A TRANSMITTED SIGNAL OVER A TIME-VARYING CHANNEL AND RECEIVER THEREOF

CROSS-REFERENCE TO RELATED APPLICATION

This application claims the benefit of priority of Singapore Patent Application No. 10201909843V, filed 22 Oct. 2019, the content of which being hereby incorporated by reference in its entirety for all purposes.

TECHNICAL FIELD

The present invention generally relates to wireless communication over a time-varying channel, and more particularly, a method of receiving a transmitted signal over a time-varying channel, a receiver thereof, and a system for wireless communication over a time-varying channel comprising the receiver.

BACKGROUND

In mobile radio communication, radar sensing, and satellite communication, very often time-varying channels (which may also be referred to as time-varying frequency-selective channels) are utilized in which the notorious Doppler shifts/spreads (frequency dispersiveness) are caused by moving transmitters, receivers, or signal reflectors. Moreover, multipath propagation leads to high frequency selectivity (time dispersiveness). Thus, in general, practical wireless channels may be characterized as time-varying frequency-selective channels, which may also be known as doubly selective channels (DSCs). The high time and frequency dispersiveness of the DSC can significantly distort the transmitted signal, and thus efficient and accurate channel estimation and equalization techniques may be desired. In other words, channel estimation and symbol detection are challenging in a DSC because of high Doppler spread and a large number of multipath that distort the signal.

A need therefore exists to provide a wireless communication method over a time-varying channel, including a method of receiving a transmitted signal over a time-varying channel, that seek to overcome, or at least ameliorate, one or more of the deficiencies in conventional wireless communication methods over a time-varying channel, such as but not limited to, improving efficiency and/or accuracy in channel estimation and symbol detection in relation to the transmitted signal, for example, improving the mean-square error (MSE) of channel estimation (CE) and the bit error rates (BER). It is against this background that the present invention has been developed.

SUMMARY

According to a first aspect of the present invention, there is provided a method of receiving a transmitted signal over a time-varying channel, the method comprising:
  obtaining a received symbol signal in frequency domain based on the transmitted signal;
  performing a first channel estimation with respect to the time-varying channel based on the received symbol signal to obtain a plurality of first estimated basis expansion model (BEM) coefficients, the time-varying channel being modeled based on a complex-exponential basis expansion model (CX-BEM);
  performing a first equalization based on the received symbol signal and the plurality of first estimated BEM coefficients to obtain a plurality of first detected source symbols; and
  performing one or more rounds of a second channel estimation and a second equalization, each round comprising:
    performing the second channel estimation with respect to the time-varying channel based on the received symbol signal and a plurality of detected source symbols to obtain a plurality of second estimated BEM coefficients;
    performing interference removal based on the received symbol signal, the plurality of detected source symbols and the plurality of second estimated BEM coefficients to obtain an interference reduced symbol signal in frequency domain; and
    performing the second equalization based on the interference reduced symbol signal and the plurality of second estimated BEM coefficients to obtain a plurality of second detected source symbols.

According to a second aspect of the present invention, there is provided a receiver for receiving a transmitted signal over a time-varying channel, the receiver comprising:
  a memory; and
  at least one processor communicatively coupled to the memory and configured to perform a method of receiving the transmitted signal as described according to the first aspect of the present invention.

According to a third aspect of the present invention, there is provided a computer program product, embodied in one or more non-transitory computer-readable storage mediums, comprising instructions executable by at least one processor to perform a method of receiving a transmitted signal over a time-varying channel as described according to the first aspect of the present invention.

According to a fourth aspect of the present invention, there is provided a system for wireless communication over a time-varying channel, the system comprising:
  a transmitter configured to transmit a signal over the time-varying channel, and
  a receiver configured to receive the transmitted signal over the time-varying channel as described according to the second aspect of the present invention.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention relate to wireless communication over a time-varying channel (which may also be referred to as a time-varying frequency-selective channel), and more particularly, a method of receiving a transmitted signal over a time-varying channel, a receiver thereof, and a system for wireless communication over a time-varying channel comprising the receiver.

As described in the background, in wireless communication over a time-varying channel, the high time and frequency dispersiveness of the time-varying channel can significantly distort the transmitted signal, and thus efficient and accurate channel estimation and equalization techniques may be desired. In other words, channel estimation and symbol detection are challenging in a time-varying channel because of high Doppler spread and a large number of multipath that distort the signal. Accordingly, various embodiments of the present invention provide a wireless communication method over a time-varying channel, including a method of receiving a transmitted signal over a time-varying channel, that seek to overcome, or at least ameliorate, one or more of the deficiencies in conventional wireless communication methods over a time-varying channel, such as but not limited to, improving efficiency and/or accuracy in channel estimation and symbol detection in relation to the transmitted signal, for example, improving the mean-square error (MSE) of channel estimation (CE) and the bit error rates (BER).

Figure 1:
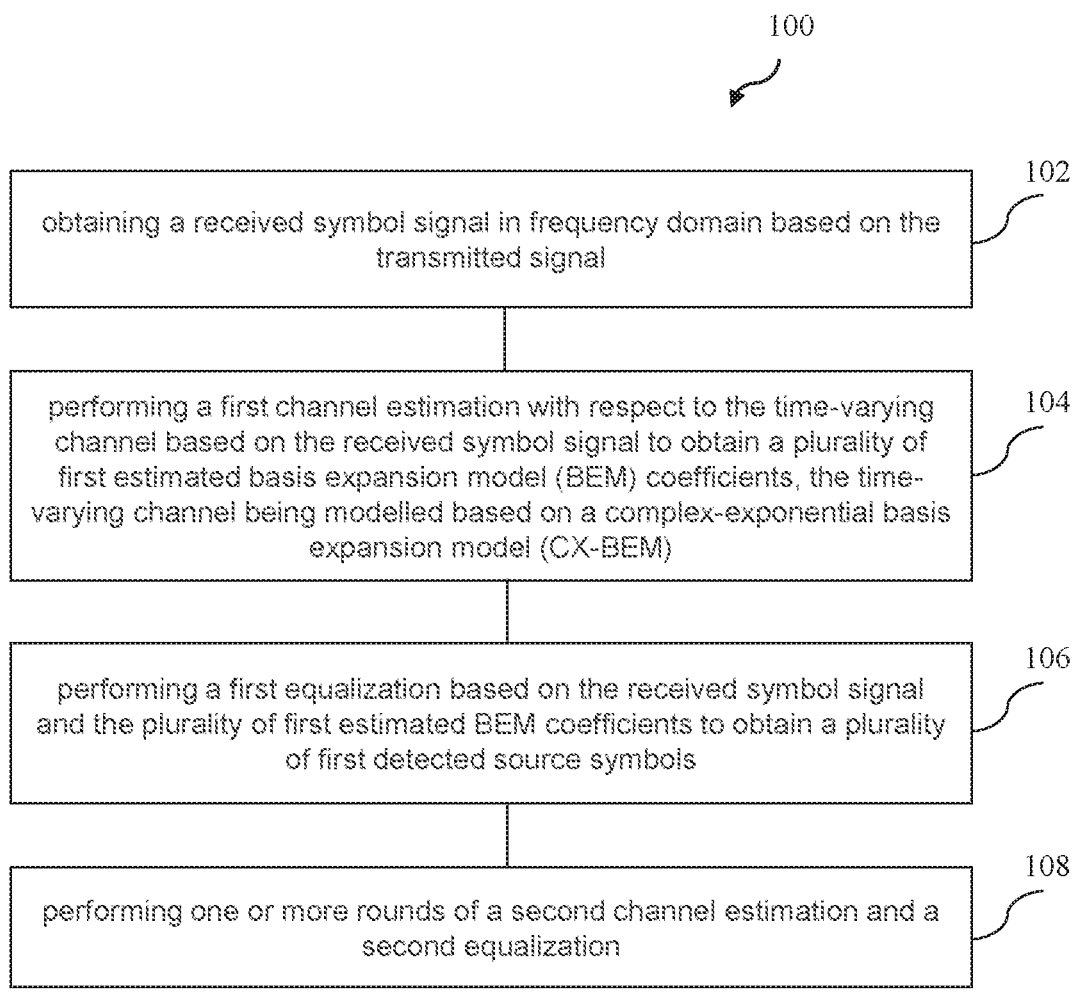
FIG. 1 depicts a schematic flow diagram of a method of receiving a transmitted signal over a time-varying channel, according to various embodiments of the present invention.

FIG. 1 depicts a schematic flow diagram of a method 100 of receiving a transmitted signal over a time-varying channel, according to various embodiments of the present invention. The method 100 comprises: obtaining (at 102) a received symbol signal in frequency domain based on the transmitted signal; performing (at 104) a first channel estimation with respect to the time-varying channel based on the received symbol signal to obtain a plurality of first estimated basis expansion model (BEM) coefficients, the time-varying channel being modeled based on a complex-exponential basis expansion model (CX-BEM); performing (at 106) a first equalization based on the received symbol signal and the plurality of first estimated BEM coefficients to obtain a plurality of first detected source symbols; and performing (at 108) one or more rounds of a second channel estimation and a second equalization, each round comprising: performing the second channel estimation with respect to the time-varying channel based on the received symbol signal and a plurality of detected source symbols to obtain a plurality of second estimated BEM coefficients; performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols.

Accordingly, various embodiments of the present invention advantageously provide a method 100 of receiving a transmitted signal over a time-varying channel with hybrid channel estimation and equalization, including interference removal in relation to the received symbol signal in frequency domain, for improving efficiency and/or accuracy in channel estimation and symbol detection in relation to the transmitted signal, for example, improving the MSE of CE and BER. In particular, the method 100 comprises a first equalization and a second equalization, which are of different types from each other and are utilized in different stages of equalization, whereby performing the interference removal in relation to the received symbol signal enables the second equalization to be performed in relation to the received symbol signal, which enables improvement in efficiency and/or accuracy in channel estimation and symbol detection in relation to the transmitted signal. These advantages or technical effects will become more apparent to a person skilled in the art as the method 100 of receiving a transmitted signal is described in more detail according to various embodiments and various example embodiments of the present invention.

In various embodiments, the method 100 further comprises determining a first estimated channel matrix based on the plurality of first BEM coefficients. In this regard, the first equalization is performed based on the received symbol signal and the first estimated channel matrix to obtain the plurality of first detected source symbols.

In various embodiments, the above-mentioned performing interference removal comprises: determining a second estimated channel matrix based on the plurality of second BEM coefficients; and decomposing the second estimated channel matrix into an estimated banded diagonal channel matrix and a complementary channel matrix (e.g., which may also be referred to as a non-banded diagonal channel matrix) of the estimated banded diagonal channel matrix.

In various embodiments, the above-mentioned performing interference removal further comprises removing interference in the received symbol signal based on the complementary channel matrix and the plurality of detected source symbols to obtain the interference reduced symbol signal.

In various embodiments, the above-mentioned interference comprises inter-carrier interference associated with non-significant subcarriers in the received symbol signal.

In various embodiments (e.g., in the case of the received symbol signal without error correction code), in a first round of the one or more rounds, the plurality of detected source symbols are the plurality of first detected source symbols.

In various embodiments (e.g., in the case of the received symbol signal without error correction code), the above-mentioned one or more rounds is a plurality of rounds. In this regard, in each subsequent round of the plurality of rounds subsequent to the first round, the plurality of detected source symbols are the plurality of second detected source symbols obtained at the immediately preceding round of the plurality of rounds.

In various embodiments, the received symbol signal is encoded based on an error correction code, and the plurality of first detected source symbols are a plurality of first detected coded source symbols. In various embodiments (e.g., in the case of the received symbol signal being encoded based on the error correction code), the method 100 further comprises: demapping and deinterleaving the plurality of first detected coded source symbols to obtain a plurality of first detected coded bits; soft decoding the plurality of first detected coded bits to obtain a plurality of first soft coded bits (i.e., soft coded bits obtained after the soft decoding); hard decoding the plurality of first detected coded bits to obtain a plurality of first hard coded bits (i.e., hard coded bits obtained after the hard decoding); interleaving and mapping the plurality of first soft coded bits to obtain a plurality of first detected soft decoded source symbols; and interleaving and mapping the plurality of first hard coded bits to obtain a plurality of first detected hard decoded source symbols. Hard decoding (which may also be referred as hard decision decoding) and soft decoding (which may also be referred as soft decision decoding) are known in the art and thus need not be described herein. For example, hard decoding may receive a stream or block of bits from a threshold detector and decodes each bit into an exact or definite value, for example, either 0 or 1. In contrast, soft decoding may receive a stream or block of bits and decodes each bit into a range of possible values (e.g., a measure of reliability or probability, such as in a range of 0 to 1).

In various embodiments (e.g., in the case of the received symbol signal being encoded based on the error correction code), the plurality of second detected source symbols are a plurality of second detected coded source symbols. In this regard, the method 100 further comprises: demapping and deinterleaving the plurality of second detected coded source symbols to obtain a plurality of second detected coded bits; soft decoding the plurality of second detected coded bits to obtain a plurality of second soft coded bits (i.e., soft coded bits obtained after the soft decoding); hard decoding the plurality of second detected coded bits to obtain a plurality of second hard coded bits (i.e., hard coded bits obtained after the hard decoding); interleaving and mapping the plurality of second soft coded bits to obtain a plurality of second detected soft decoded source symbols; and interleaving and mapping the plurality of second hard coded bits to obtain a plurality of second detected hard decoded source symbols.

In various embodiments (e.g., in the case of the received symbol signal being encoded based on the error correction code), in a first round of the one or more rounds, the plurality of detected source symbols are the plurality of first detected hard decoded source symbols.

In various embodiments (e.g., in the case of the received symbol signal being encoded based on the error correction code), in the first round of the one or more rounds, the second equalization is performed further based on the plurality of first detected soft decoded source symbols.

In various embodiments (e.g., in the case of the received symbol signal being encoded based on the error correction code), the one or more rounds is a plurality of rounds; and, in each subsequent round of the plurality of rounds subsequent to the first round, the plurality of detected source symbols are the plurality of second detected hard decoded source symbols obtained at the immediately preceding round of the plurality of rounds.

In various embodiments (e.g., in the case of the received symbol signal being encoded based on the error correction code), in the above-mentioned each subsequent round of the plurality of rounds, the second equalization is performed further based on the plurality of second detected soft decoded source symbols.

In various embodiments, the received symbol signal comprises a plurality of frames, and the method 100 further comprises performing, for each of the plurality of frames, inter-frame channel interpolation of estimated channel gains in the frame.

In various embodiments, the above-mentioned inter-frame channel interpolation comprises: determining an inter-frame channel interpolation polynomial function based on estimated channel gains in an intermediate portion of the frame; and modifying estimated channel gains in at least one of a beginning portion and an end portion of the frame based on the inter-frame channel interpolation polynomial function.

In various embodiments, the transmitted signal is transmitted over the time-varying channel based on orthogonal frequency division multiplexing (OFDM) transmission.

In various embodiments, the first channel estimation is based on a pilot-aided channel estimation, the first equalization is based on a minimum mean-square error (MMSE) equalization, the second channel estimation is based on a data-aided channel estimation, and the second equalization is based on a maximum likelihood sequence estimation (MLSE) equalization.

In various embodiments, the above-mentioned obtaining the received symbol signal comprises performing a discrete Fourier transform (DFT) based on the transmitted signal.

In various embodiments, there is provided a method of transmitting a signal over a time-varying channel. In various embodiments, the signal is transmitted over the time-varying channel based on OFDM transmission. In various embodiments, the signal has been encoded based on an error correction code.

In various embodiments, there is provided a wireless communication method comprising the above-mentioned method of transmitting a signal over a time-varying channel and the above-mentioned method 100 of receiving the transmitted signal over the time-varying channel as described hereinbefore with reference to FIG. 1 according to various embodiments.

Figure 2:
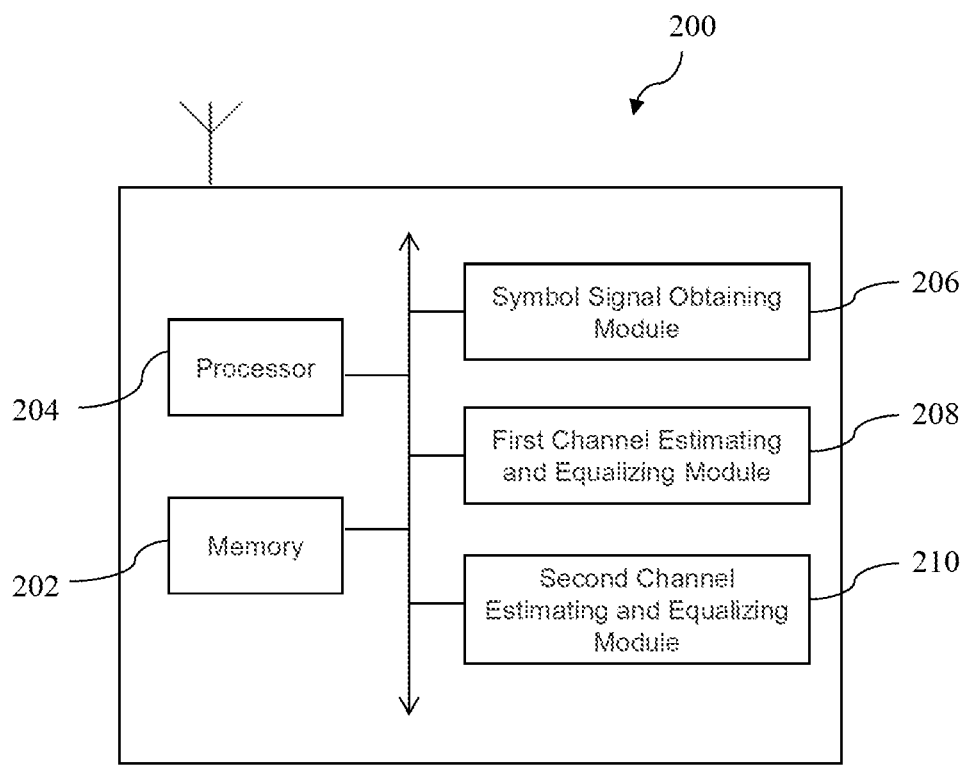
FIG. 2 depicts a schematic drawing of a receiver for receiving a transmitted signal over a time-varying channel, according to various embodiments of the present invention.

FIG. 2 depicts a schematic drawing of a receiver 200 for receiving a transmitted signal over a time-varying channel, according to various embodiments of the present invention, corresponding to the method 100 of receiving a transmitted signal over a time-varying channel as described hereinbefore with reference to FIG. 1 according to various embodiments of the present invention. The receiver 200 comprises a memory 202 and at least one processor 204 communicatively coupled to the memory 202 and configured to: obtain (corresponding to 102) a received symbol signal in frequency domain based on the transmitted signal; performing (corresponding to 104) a first channel estimation with respect to the time-varying channel based on the received symbol signal to obtain a plurality of first estimated basis expansion model (BEM) coefficients, the time-varying channel being modeled based on a complex-exponential basis expansion model (CX-BEM); perform (corresponding to 106) a first equalization based on the received symbol signal and the plurality of first estimated BEM coefficients to obtain a plurality of first detected source symbols; and perform (at 108) one or more rounds of a second channel estimation and a second equalization, each round comprising: performing the second channel estimation with respect to the time-varying channel based on the received symbol signal and a plurality of detected source symbols to obtain a plurality of second estimated BEM coefficients; performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols. It will be appreciated to a person skilled in the art that the receiver 200 may be a receiver system, which may also be embodied as a receiver device or a receiver apparatus.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the receiver 200 may further comprise a symbol signal obtaining module (or a symbol signal obtaining circuit) 206 configured to obtain a received symbol signal in frequency domain based on the transmitted signal; a first channel estimating and equalizing module (or a first channel estimating and equalizing circuit) 208 configured to: perform a first channel estimation with respect to the time-varying channel based on the received symbol signal to obtain a plurality of first estimated BEM coefficients, the time-varying channel being modeled based on a CX-BEM; and perform a first equalization based on the received symbol signal and the plurality of first estimated BEM coefficients to obtain a plurality of first detected source symbols; and a second channel estimating and equalizing module (or a second channel estimating and equalizing circuit) 210 configured to perform one or more rounds of a second channel estimation and a second equalization, each round comprising: performing the second channel estimation with respect to the time-varying channel based on the received symbol signal and a plurality of detected source symbols to obtain a plurality of second estimated BEM coefficients; performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols.

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. For example, the symbol signal obtaining module 206, the first channel estimating and equalizing module 208 and the second channel estimating and equalizing module 210 may be realized (e.g., compiled together) as one executable software program (e.g., software application or simply referred to as an "app"), which for example may be stored in the memory 202 and executable by the at least one processor 204 to perform the functions/operations as described herein according to various embodiments.

In various embodiments, the receiver 200 corresponds to the method 100 as described hereinbefore with reference to FIG. 1, therefore, various functions or operations configured to be performed by the least one processor 204 may correspond to various steps of the method 100 described hereinbefore according to various embodiments, and thus need not be repeated with respect to the receiver 200 for clarity and conciseness. In other words, various embodiments described herein in context of the method 100 are analogously valid for the corresponding receiver 200, and vice versa.

For example, in various embodiments, the memory 202 may have stored therein the symbol signal obtaining module 206, the first channel estimating and equalizing module 208 and/or the second channel estimating and equalizing module 210, which respectively correspond to various steps of the method 100 as described hereinbefore according to various embodiments, which are executable by the at least one processor 204 to perform the corresponding functions or operations.

Figure 3:
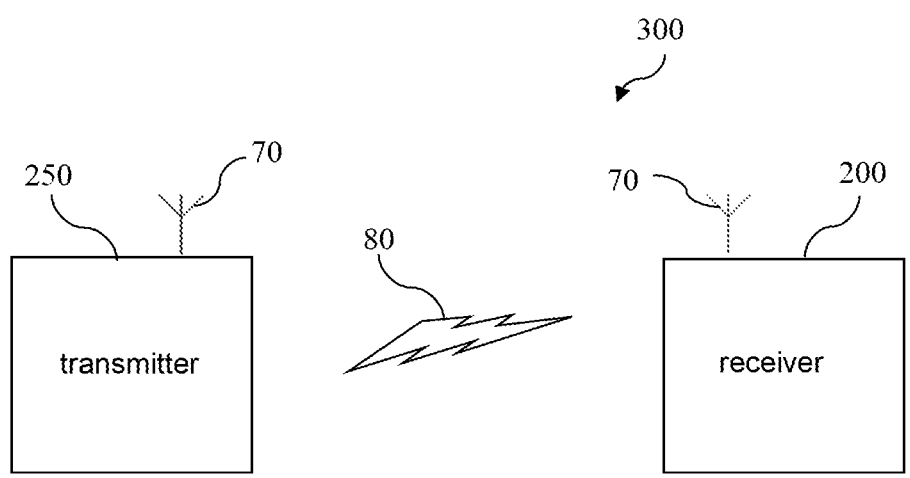
FIG. 3 depicts a system for wireless communication (or a wireless communication system) over a time-varying channel, according to various embodiments of the present invention.

FIG. 3 depicts a system 300 for wireless communication (or a wireless communication system) over a time-varying channel, according to various embodiments of the present invention. The system 300 comprises a transmitter 250 configured to transmit a signal 80 over the time-varying channel (e.g., corresponding to the method of transmitting a signal 80 over a time-varying channel as described hereinbefore according to various embodiments) and a receiver 200 configured to receive the transmitted signal 80 over the time-varying channel as described hereinbefore with reference to FIG. 2 according to various embodiments of the present invention.

A computing system, a controller, a microcontroller or any other system providing a processing capability may be provided according to various embodiments in the present disclosure. Such a system may be taken to include one or more processors and one or more computer-readable storage mediums. For example, the transmitter 250 and the receiver 200 described hereinbefore may each include a processor (or controller) and a computer-readable storage medium (or memory) which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "performing", "determining", "decomposing", "removing", "interleaving", "deinterleaving", "decoding", "encoding", "estimating", "modifying", "transmitting", "receiving" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system (e.g., which may also be embodied as a device or an apparatus) for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

It will be appreciated by a person skilled in the art that various modules described herein (e.g., the symbol signal obtaining module 206, the first channel estimating and equalizing module 208 and/or the second channel estimating and equalizing module 210) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, two or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the symbol signal obtaining module 206, the first channel estimating and equalizing module 208 and/or the second channel estimating and equalizing module 210) executable by one or more computer processors to perform a method 100 of receiving a transmitted signal over a time-varying channel, as described hereinbefore with reference to FIG. 1. Accordingly, various computer programs or modules described herein may be stored in a computer program product receivable by a system therein, such as the receiver 200 as shown in FIG. 2, for execution by at least one processor 204 of the receiver 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
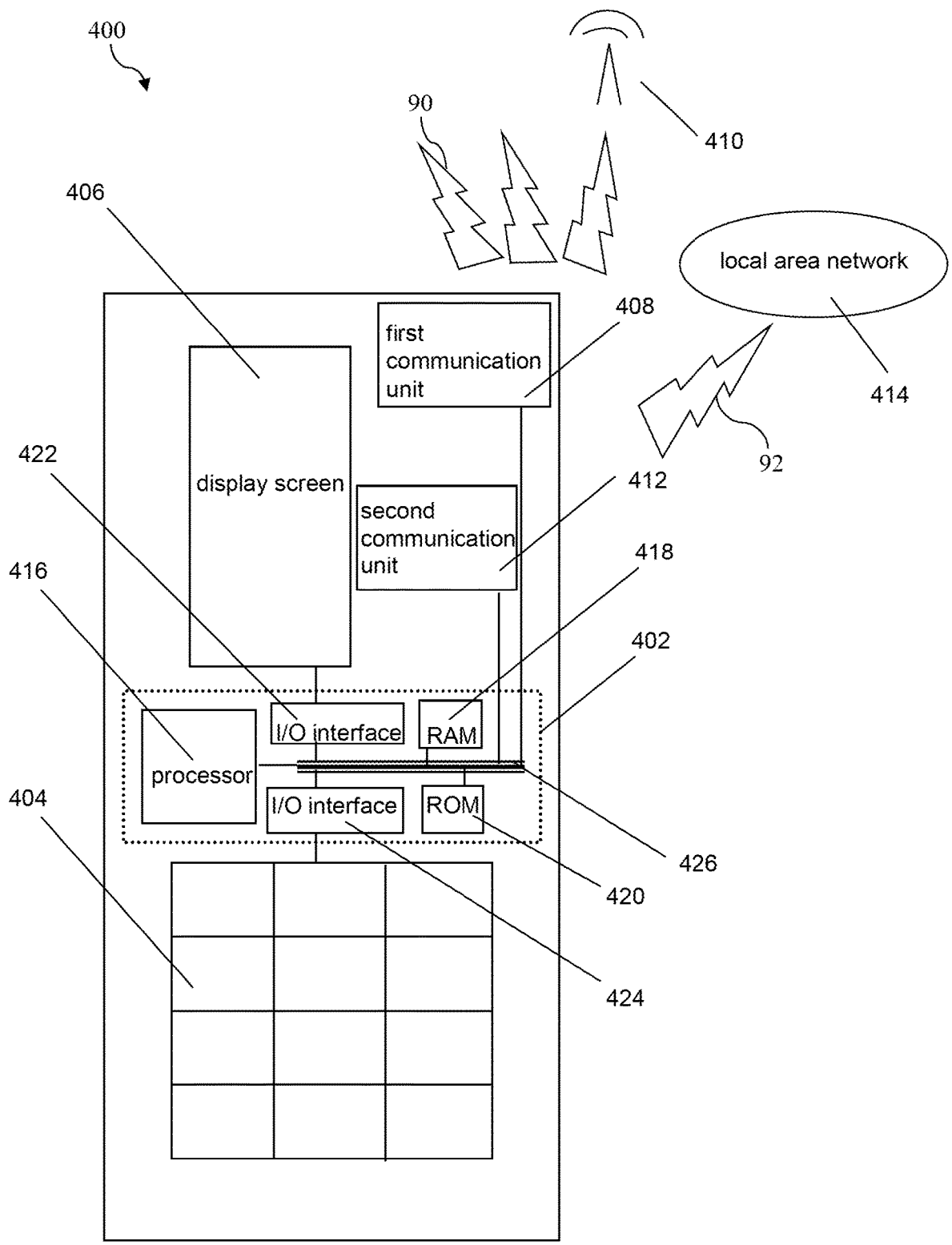
FIG. 4 depicts a schematic block diagram of an example mobile communication device in which the receiver for receiving a transmitted signal over a time-varying channel as described with reference to FIG. 2 may be embodied, according to various example embodiments of the present invention.

In various embodiments, the receiver 200 may be realized by any computer system having communication functionality or capability (e.g., desktop or portable computer system, which may also be embodied as a computing device, such as a mobile communication device (e.g., a smartphone, a tablet computer, a wearable device) or a car navigation system), including at least one processor and a memory. By way of an example only and without limitation, an example mobile communication device 400 is schematically shown in FIG. 4 in which the receiver 200 may be implemented, and various methods/steps or functional modules (e.g., the symbol signal obtaining module 206, the first channel estimating and equalizing module 208 and/or the second channel estimating and equalizing module 210) may be implemented as software, such as a computer program being executed within the mobile communication device 400, and instructing the mobile communication device 400 (in particular, at least one processor therein) to conduct the methods/functions of various embodiments described herein.

In various embodiments, the mobile communication device 400 may comprise a processor module 402, an input module such as a keypad 404 and an output module such as a display screen 406. It can be appreciated by a person skilled in the art that the display screen 406 may be a touch-sensitive display screen, and thus may also constitute an input module being in addition to, or instead of, the keypad 404. That is, it can be appreciated by a person skilled in the art that the keypad 404 may be omitted from the portable computing device 400 as desired or as appropriate. The processor module 402 is coupled to a first communication unit 408 for communication of signal 90 with a cellular network 410. The first communication unit 408 can include but is not limited to a subscriber identity module (SIM) card loading bay. The cellular network 410 can, for example, be a 3G, 4G or 5G network. The processor module 402 may further be coupled to a second communication unit 412 for connection to a local area network 414. For example, the connection can enable wired/wireless communication of signal 90 and/or access to, e.g., the Internet or other network systems such as Local Area Network (LAN), Wireless Personal Area Network (WPAN) or Wide Area Network (WAN). The second communication unit 312 may include but is not limited to a wireless network card or an Ethernet network cable port. The processor module 402 in the example includes a processor 416, a Random Access Memory (RAM) 418 and a Read Only Memory (ROM) 420. The processor module 402 also includes a number of Input/Output (I/O) interfaces, for example I/O interface 422 to the display screen 406, and I/O interface 424 to the keypad 404. The components of the processor module 402 typically communicate via an interconnected bus 426 and in a manner known to the person skilled in the relevant art. Various software or application programs (or may simply be referred to herein as "apps") may be pre-installed in a memory of the mobile communication device 400 or may be transferred to a memory of the mobile communication device 400 by reading a memory card having stored therein the application programs or by downloading wirelessly from an application server (e.g., an online app store).

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second", and so forth does not limit the quantity or order of such elements or features. For example, such designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to wireless communication based on OFDM transmission over a time-varying frequency-selective channel (which may also be referred to as a doubly selective channel (DSC)), whereby the DSC is modeled as a complex-exponential basis expansion model (CX-BEM), and moreover, the first equalization and the second equalization are based on a MMSE equalization and a MLSE equalization, respectively.

Various example embodiments provide methodologies for wireless transmission and reception over a DSC. As described in the background, channel estimation and symbol detection are challenging in a DSC because of high Doppler spread and a large number of multipath that distort the transmitted signal. In various example embodiments, to seek to overcome, or at least ameliorate, this problem, a channel estimation and equalization scheme or method (e.g., a hybrid iterative channel estimation and equalization method) for OFDM transmission over a DSC is provided. To facilitate channel estimation of a time varying channel, the DSC is modeled as a CX-BEM. Based on the CX-BEM, various example embodiments provide a hybrid MMSE-maximum likelihood sequence estimation (MLSE) detector (e.g., corresponding to the method 100 of or the receiver 200 for receiving a transmitted signal over a time-varying channel as described hereinbefore according to various embodiments) that performs MMSE detection (which may also be referred to as MMSE equalization) in the first iteration (e.g., corresponding to the first channel estimation and the first equalization as described hereinbefore according to various embodiments, which may also be referred to as a round of the first channel estimation and the first equalization), followed by interference cancellation and MLSE detection (which may also be referred to as MLSE equalization) in the subsequent iteration(s) (e.g., corresponding to the one or more rounds of the second channel estimation and the second equalization as described hereinbefore according to various embodiments). Various example embodiments also provide optimal power distribution between the data symbols and the pilot symbols at the transmitter, and inter-frame channel interpolation at the receiver, as additional methods to further improve the system performance at high fading rates. Simulation results show that methods for wireless communication (e.g., corresponding to the method 100 of receiving a transmitted signal over a time-varying channel as described hereinbefore according to various embodiments) according to various example embodiments significantly improve the MSE of channel estimation (CE), as well as the BER as compared to conventional methods, under both without and with FEC scenarios. Moreover, the BER performance of the methods according to various example embodiments approach very close to the perfect CSI case, at both low and high fading rates.

In mobile radio communication, radar sensing, and satellite communication, very often time-varying channels are required in which the notorious Doppler shifts/spreads (frequency dispersiveness) are caused by moving transmitters, receivers, or signal reflectors. Moreover, multipath propagation leads to high frequency selectivity (time dispersiveness). Thus, in general, practical wireless channels may be characterized as DSCs. The high time and frequency dispersiveness of the DSC can significantly distort the transmitted signal, and thus efficient and accurate channel estimation and equalization techniques may be desired.

Accordingly, various example embodiments provide channel estimation and equalization techniques for OFDM transmission over a DSC that to seek to overcome, or at least ameliorate, the above-mentioned problems. In various example embodiments, firstly, a hybrid iterative channel estimation and equalization method (which may be herein referred to as MMSE&IC-MLSE, e.g., corresponding to the method 100 of receiving a transmitted signal over a time-varying channel as described hereinbefore according to various embodiments) for channel estimation and symbol detection at the receiver end. In the first round of the detection (e.g., corresponding to the first channel estimation and the first equalization as described hereinbefore according to various embodiments), the hybrid iterative channel estimation and equalization method may use pilot symbols to perform pilot-aided CE (e.g., corresponding to the first channel estimation as described hereinbefore according to various embodiments) and a MMSE equalizer (e.g., corresponding to the first equalization as described hereinbefore according to various embodiments) for symbol detection. In the subsequent iteration(s) (e.g., corresponding to the one or more rounds of the second channel estimation and the second equalization as described hereinbefore according to various embodiments), the hybrid iterative channel estimation and equalization method may use the detected symbols (detected source symbols) obtained from the last iteration (immediately preceding iteration) to perform data-aided CE (e.g., corresponding to the second channel estimation as described hereinbefore according to various embodiments) and to perform MLSE equalization (e.g., corresponding to the second equalization as described hereinbefore according to various embodiments) plus interference cancellation (IC) (e.g., corresponding to the interference removal as described hereinbefore according to various embodiments) for symbol detection.

In various example embodiments, the hybrid iterative channel estimation and equalization method may be configured for (or extended to) the scenario that an error correction code (e.g., a forward error correction (FEC) code) is used. In such a scenario, for example, the channel estimation block associated with the MLSE equalizer may use the symbols (detected hard decoded source symbols) recovered from the hard decoded bits (hard coded bits obtained after hard decoding) to performance data-aided CE (e.g., corresponding the second channel estimation in the case of the received symbol signal being encoded based on an error correction code as described hereinbefore according to various embodiments), and the MLSE equalizer (e.g., corresponding the second equalization in the case of the received symbol signal being encoded based on the error correction code as described hereinbefore according to various embodiments) may use the soft-outputs (soft coded bits obtained after the soft decoding) of the channel decoder to perform turbo equalization. Simulation results demonstrate that by using the hybrid iterative channel estimation and equalization method according to various example embodiments, the CE and BER performance can be significantly improved as compared to conventional iterative techniques (e.g., as described in Barhumi et al., "MLSE and MAP equalization for transmission over doubly selective channels," *IEEE Trans. Veh. Technol.*, vol. 58, no. 8, pp. 4120-4128, October 2009" and Tang et al., "Pilot-assisted time-varying channel estimation for OFDM systems," *IEEE Trans. Signal Process.*, vol. 55, no. 5, pp. 2226-2238, May 2007) under both without and with FEC scenarios. In particular, the BER performance of the hybrid iterative channel estimation and equalization method according to various example embodiments is demonstrated to advantageously approach that of the perfect CSI based equalization.

In addition, various example embodiments note that the MSE of the CE is higher at the transmission block edges as compared to the center of the transmission block. Furthermore, various example embodiments note that these errors are attributed to the block-based transmission with rectangular windowing which may result in imprecise BEM modeling of the channel. In the literature, various conventional windowing techniques have been proposed at the receiver to reduce the modeling errors, such as described in Qu et al., "On the estimation of doubly-selective fading channels," *IEEE Trans. Wireless Commun.*, vol. 9, no. 4, pp. 1261-1265, April 2010. In contrast, in various example embodiments, an inter-frame channel interpolation method (e.g., inter-frame channel interpolation based on least-square (LS) fitting method) is provided to reduce the MSE of CE at the transmission block edges. In this regard, it can be observed from simulation results that the overall performance of CE and BER can be further improved by using the inter-frame channel interpolation method according to various example embodiments of the present invention.

Furthermore, various example embodiments provide or use appropriate power allocation between the data symbols and the pilot symbols in the transmission frames to further improve the CE and BER performance of the system.

Accordingly, various example embodiments advantageously provide one or more of the following:
- a hybrid iterative channel estimation and equalization method (MMSE&IC-MLSE) for OFDM transmission over a DSC. In various example embodiments, the hybrid iterative channel estimation and equalization method may be configured respectively for both scenarios of FEC being used and not being used. It is found that the hybrid iterative channel estimation and equalization method significantly outperforms conventional pilot-based iterative CE and equalization method for both the scenarios of with and without FEC, especially when the Doppler spread of the channel is high,
- for continuous transmission of data blocks, an inter-frame channel interpolation method according to various example embodiments may be provided to reduce the MSE of CE at the transmission block edges. The overall performance of the CE and BER can be further improved by using the inter-frame channel interpolation method according to various example embodiments of the present invention, various example embodiments may further use appropriate power allocation between the data symbols and the pilot symbols in the transmission frames to further improve the CE and BER performance of the hybrid iterative channel estimation and equalization method.

The performance analysis of methods according to various example embodiments will also be discussed later below in terms of the MSE of the channel estimation, and the BER after equalization and/or decoding. For example, it will be demonstrated that methods according to various example embodiments are able to achieve the channel MSE lower bound in the mid to high SNR regions, and after 4 iterations, the BER approaches that obtained under perfect CSI condition. Extensive simulation results are also provided for various fading scenarios, showing the advantages of the methods according to various example embodiments over conventional methods.

System and Channel Model
System Model

Various example embodiments may consider transmission over a DSC with one antenna 70 each at the transmitter and the receiver. A data sequence x[n] of length N is transmitted at a rate of 1/T symbols/s over the DSC. The discrete-time baseband equivalent of the received symbol at the $n^{th}$ time instant may be written as:

$$y[n]=\Sigma_{l=0}^{L} h[n;l]x[n-l]+v[n] \quad \text{(Equation 1)}$$

where h[n; l] denotes the discrete-time equivalent baseband representation of the DSC, which subsumes the physical multipath channel together with the transmit and receive pulse shaping filters, l denotes the $l^{th}$ multi-path, L denotes the number of multipaths and is given as $$L = \left\lfloor \frac{\tau_{max}}{T} \right\rfloor$$

with $\tau_{max}$ being the maximum delay spread of the channel, and v[n] denotes the circularly symmetric complex additive white Gaussian noise (AWGN) with $v[n] \sim CN(0,\sigma_v^2)$.

Figure 5:
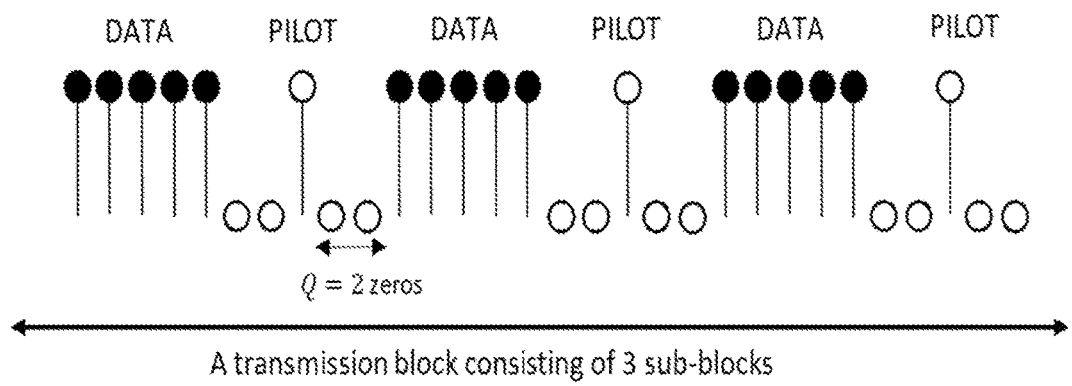
FIG. 5 depicts a schematic drawing of a transmission block comprising three transmission sub-blocks, according to various example embodiments of the present invention.

According to various example embodiments, an exemplary block transmission design may be adopted where the pilot symbols are multiplexed with the data symbols by periodically placing them in the transmission block, such as illustrated in FIG. 5. In particular, FIG. 5 depicts a schematic drawing of an example transmission block comprising three transmission sub-blocks, each transmission sub-block comprising a data sub-block (shown in black solid circle) and a pilot sub-block (shown in outlined circle, e.g., a time-domain Kronecker delta (TDKD) pilot cluster). Each pilot sub-block includes a pulse in the center, and surrounded by Q zeros on both sides, where Q denotes the number of BEM coefficients, which will be described later below in further detail. In various example embodiments, the pilot positions may be optimized to further improve the CE performance.

Channel Model

In various example embodiments, the channel h[n;l] (e.g., corresponding to the time-varying channel as described hereinbefore according to various embodiments) may be modeled using the CX-BEM where the $l^{th}$ tap of the channel at the $n^{th}$ time-instant is expressed as a weighted combination of the complex exponentials bases functions, and may be expressed as:

$$h[n;l]=\Sigma_{q=0}^{Q} \tilde{h}_q(l)e^{j\omega_q n}, \quad \text{(Equation 2)}$$

where $$\omega_q = \frac{2\pi}{K}\left(q - \left\lceil \frac{Q}{2} \right\rceil\right),$$

$q \in \{0, 1, \ldots, Q\}$ denotes the $q^{th}$ BEM modeling frequency, $K \geq N$ is the BEM resolution. In various example embodiments, the modeling frequency may be taken to be uniformly distributed between $$\left[\frac{2\pi}{K}\left(-\left\lceil \frac{Q}{2} \right\rceil\right), \frac{2\pi}{K}\left(\left\lceil \frac{Q}{2} \right\rceil\right)\right].$$

In various other example embodiments, the modeling frequency may be taken to be non-uniformly spaced to further reduce the BEM modelling error. $\tilde{h}_q(l)(q \in \{0, 1, \ldots, Q\})$ denotes the weight or the $q^{th}$ BEM coefficient corresponding to the $l^{th}$ path, and Q denotes the number of BEM coefficients. It has been mentioned in the art that Q should be given as $Q=[2f_{max}NT]$, where $f_{max}$ is the channel maximum Doppler spread. Accordingly, substituting Equation (2) into Equation (1), it can be obtained that:

$$y[n]=\Sigma_{q=0}^{Q}\Sigma_{l=0}^{L}e^{j\omega_q n}\tilde{h}_q(l)x[n-l]+v[n] \quad \text{(Equation 3)}$$

Defining $y=[y[0], \ldots, y[N-1]]^T$, in a block-level, the received vector y may be expressed as:

$$y=\Sigma_{q=0}^{Q}\Sigma_{l=0}^{L}\tilde{h}_q(l)D_q Z_l x+v \quad \text{(Equation 4)}$$

where $D_q$ is the diagonal matrix with the $q^{th}$ basis function components on its diagonal, i.e., $D_q=\text{diag}\{[1, e^{j\omega_q}, \ldots e^{j2\pi(N-1)\omega_q}]^T\}$, $Z_l$ is an N× (N+L) Toeplitz matrix defined as $Z_l=[0_{N \times (L-l)}, I_N, 0_{N \times l}]$, where $I_N$ is a N×N identity matrix. The transmitted symbol vector x is defined as $x=[x[-L], \ldots, x[N-1]]^T$, and v is the additive noise vector defined as $v=[v[0], \ldots, v[N-1]]^T$.

Figure 6:
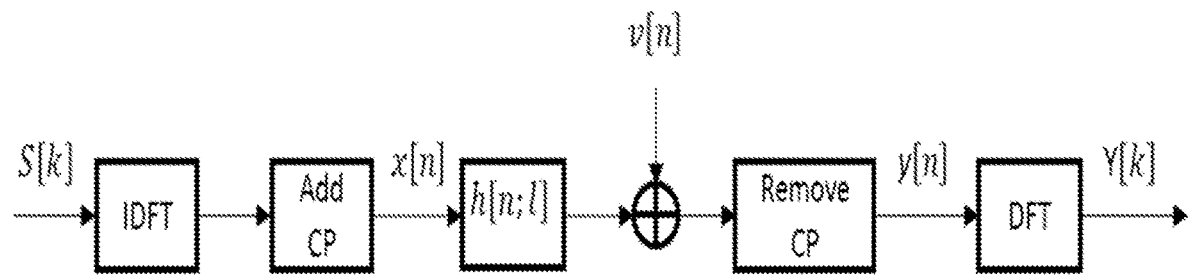
FIG. 6 depicts a schematic block diagram of OFDM transmission, according to various example embodiments of the present invention.

FIG. 6 depicts a schematic block diagram of OFDM transmission, according to various example embodiments of the present invention. For OFDM transmission, as shown in FIG. 6, the frequency-domain information symbols may firstly be divided into transmission blocks of N symbols, with each symbol transmitted on a subcarrier in parallel. Each transmission block may then be transformed to time domain by inverse discrete Fourier transform (IDFT). Then, a cyclic prefix (CP) of length $v \geq L$ may be added in front of each transmission block. In various example embodiments, the CP may actually be the repeat of the last v points of each transmission block after IDFT. The CP-added transmission blocks (e.g., corresponding to the transmitted signal as described hereinbefore according to various embodiments) may then be transmitted through the channel. Suppose S[k] is the frequency-domain symbol which is transmitted by the $k^{th}$ subcarrier, after IDFT, the $n^{th}$ symbol transmitted on time-domain may be expressed as:

$$x[n] = \frac{1}{\sqrt{N}}\Sigma_{k=0}^{N-1} S[k]e^{j2\pi(n-v)k/N}, \quad \text{(Equation 5)}$$

$$n = 0, \ldots, N+v-1$$

At the receiver side, after removing CP, the block-level received vector y in time-domain may be written as:

$$y = \sum_{q=0}^{Q}\sum_{l=0}^{L} \tilde{h}_q(l) D_q \tilde{Z}_l F^H S + v \quad \text{(Equation 6)}$$

where F is the N×N unitary DFT matrix with the element on the $i^{th}$ row and $j^{th}$ column equals to $$\frac{1}{\sqrt{N}} e^{-j2\pi(i-1)(j-1)/N},$$

$(\cdot)^H$ denotes Hermitian transpose. $\tilde{Z}_l$ is an N×N circular matrix with the first column has 1 in position l+1, that is:

$$\tilde{Z}_l = l\begin{cases} \begin{pmatrix} 0 & \cdots & 0 & 1 & \cdots & 0 \\ \vdots & \ddots & \vdots & & \ddots & \vdots \\ 0 & 0 & 0 & 0 & 0 & 1 \\ 1 & 0 & 0 & 0 & 0 & 0 \\ \vdots & \ddots & \vdots & & \ddots & \vdots \\ 0 & \cdots & 1 & 0 & \cdots & 0 \end{pmatrix} \end{cases} \quad \text{(Equation 7)}$$

and $S = [S[0], \ldots, S[N-1]]^T$ is the source symbol vector. After DFT, the block-level received vector Y in frequency domain (e.g., corresponding to the received symbol signal in frequency domain as described hereinbefore according to various embodiments) may be expressed as:

$$Y = \sum_{q=0}^{Q}\sum_{l=0}^{L} \tilde{h}_q(l) F D_q \tilde{Z}_l F^H S + V \quad \text{(Equation 8)}$$

where $V = [V[0], \ldots, V[N-1]]^T$ is the noise vector in the frequency-domain, with V[k] being the noise on the $k^{th}$ subcarrier.

Iterative Channel Estimation and Data Equalization

At the receiver side, the received vector Y is used to perform channel estimation and data detection. A conventional iterative CE and equalization method has been disclosed in Barhumi et al., "MLSE and MAP equalization for transmission over doubly selective channels," *IEEE Trans. Veh. Technol.*, vol. 58, no. 8, pp. 4120-4128, October 2009, and a schematic block diagram of the conventional iterative CE and equalization method disclosed in the above-mentioned Barhumi reference is shown in FIG. 7.

Figure 7:
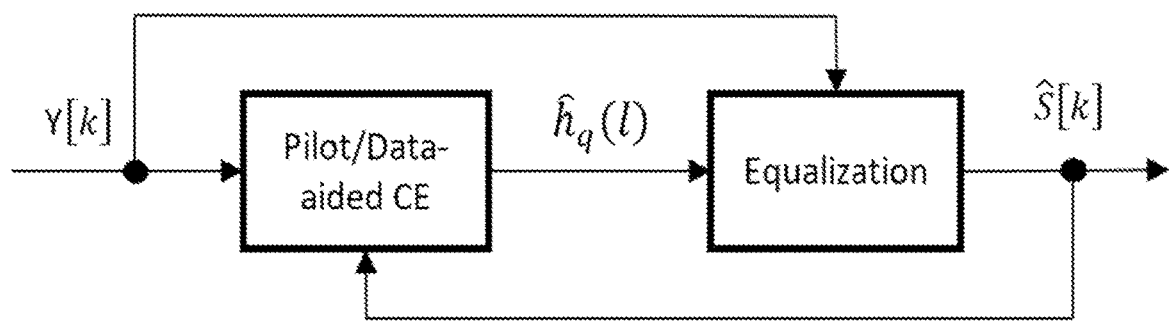
FIG. 7 depicts a schematic block diagram of a conventional iterative channel estimation (CE) and equalization system.

As shown in FIG. 7, the received signal Y[k], together with the known pilot symbols, are firstly used to perform a pilot-aided CE. After that, the estimated BEM coefficients $\hat{h}_q^p(l)$ are used by an equalization block to perform data detection in frequency domain. After that, if iteration is used, the detected data $\hat{S}[k]$ may be feedback to the CE block to perform data-aided CE and the estimated BEM coefficients $\hat{h}_q^d(l)$ may be used by the equalization block to perform data detection again. This CE and equalization may be repeated until no more performance gain can be achieved.

Conventional frequency domain equalization schemes for OFDM transmission have been separately disclosed, including maximum likelihood sequence estimation (MLSE) (e.g., as described in the above-mentioned Barhumi reference) and minimum mean square error (MMSE) equalization (e.g., as described in the above-mentioned Tang reference), which are described below.

Conventional MLSE Equalization

According to the above-mentioned Barhumi reference, when K=N, suppose Q is an even number, the received signal on the $k^{th}$ subcarrier may be written as:

$$Y[k] = \sum_{l=0}^{L}\sum_{q=0}^{Q} e^{j2\pi(q-\frac{Q}{2}-k)l/N} \tilde{h}_q(l) S\left[\left.k + \frac{Q}{2} - q\right|_N\right] + V[k] \quad \text{(Equation 9)}$$

where $|\cdot|_N$ denotes modulo of N. From Equation (9), various example embodiments note that Y[k] is related to source symbols on Q consecutive subcarriers, and a MLSE equalizer may be used to perform maximum likelihood detection of S[k]. The Viterbi algorithm is commonly used by the MLSE detector to perform symbol detection. Define the state of the $k^{th}$ subcarrier in the Viterbi algorithm as $$s_k = \left\{ S\left[\left.k - \frac{Q}{2}\right|_N\right], S\left[\left.k - \frac{Q}{2} + 1\right|_N\right], \ldots, S\left[\left.k + \frac{Q}{2} - 1\right|_N\right] \right\}.$$

If the alphabet size of S[k] is M, the total number of states in the Viterbi algorithm is $M^Q$. Let $s_k(i)$, $i \in \{0, 1, \ldots, M^{Q-1}\}$ denote different states of the $k^{th}$ subcarrier. The accumulated metric of $s_k(i)$ may be defined as $\Gamma(s_k(i))$. The branch metric associated with the state transition from $s_{k-1}(j)$ to $s_k(i)$ may be denoted by $\gamma(s_{k-1}(j) \to s_k(i))$. The MLSE equalization for OFDM may include the following steps:

1. Start from the $0^{th}$ subcarrier. For each state $s_0(i)$, $i \in \{0, 1, \ldots, M^{Q-1}\}$, initialize the accumulated metric as $\Gamma(s_0(i)) = 0$.
2. For the $k^{th}$ subcarrier, let $s_{k-1}(j_0), \ldots, s_{k-1}(j_{M-1})$ be the M preceding states of $s_k(i)$, and the source symbol vector associated with the state transition being $S(s_{k-1}(j_m) \to s_k(i)) = \{S_{j_m,i}[0], S_{j_m,i}[1], \ldots, S_{j_m,i}[Q]\}$. For each $s_{k-1}(j_m)$, $m \in \{0, 1, \ldots, M-1\}$, compute the branch metric by:

$$\gamma(s_{k-1}(j_m) \to s_k(i)) = \\ \left| Y[k] - \sum_{l=0}^{L}\sum_{q=0}^{Q} e^{j2\pi(q-\frac{Q}{2}-k)l/N} \tilde{h}_q(l) S_{j_m,i}[Q-q] \right|^2 \quad \text{(Equation 10)}$$

3. Calculate the accumulated metric of the $k^{th}$ subcarrier by:

$$\Gamma(s_k(i)) = \min_{j_m} (\Gamma(s_{k-1}(j_m)) + \gamma(s_{k-1}(j_m) \to s_k(i))) \quad \text{(Equation 11)}$$

4. Keep the preceding state $j_m$ which leads to minimum $\Gamma(s_k(i))$ in a table.
5. Set $k \leftarrow k+1$ and go back to step 2 or go to step 6 if k=N.
6. Find the most likely transmitted sequence recursively by tracing back from the state with minimum accumulated metric $\Gamma(s_{N-1}(i))$.

Various example embodiments note that in the above-mentioned step 2, for Equation (10), the calculation of branch metric requires the knowledge of the BEM coefficients $\tilde{h}_q(l)$. In practice, since $\tilde{h}_q(l)$ is normally unknown, various example embodiments may advantageously utilize the estimated BEM coefficients $\hat{h}_q(l)$ instead of $\tilde{h}_q(l)$ in the calculation of the branch metric.

Conventional MMSE Equalization

In the above-mentioned Tang reference, a banded MMSE equalizer for OFDM is disclosed and may include the following steps:

1. Make calculation of original channel matrix H by:

$$H = \sum_{q=0}^{Q}\sum_{l=0}^{L} \tilde{h}_q(l) F D_q \tilde{Z}_l F^H \quad \text{(Equation 12)}$$

2. Make calculation of matrix G by:

$$G = (\overline{H}_K \overline{H}_K^H + R_n + \sigma^2 I) \quad \text{(Equation 13)}$$

where $\overline{H}_K$ is the banded approximation of the original channel matrix H, i.e., $\overline{H}_K = H \odot T_k$ with $T_k$ being an N×N matrix whose main diagonal, K sub-diagonals, and K super-diagonals are ones, and the remaining entries are zero. $R_n$ is the covariance matrix of the noise, and $\sigma^2 I$ is a regularization term which servers to prevent performance degradation at high SNR.

3. The detected source symbol vector $\hat{S}=[\hat{S}[0], \ldots , \hat{S}[N-1]]^T$ may be given by $$\hat{S}=\overline{H}_K{}^H G^{-1} Y \quad \text{(Equation 14)}$$

Various example embodiments note that in the above-mentioned step 1, since $\tilde{h}_q(l)$ is normally unknown in practice, various example embodiments may advantageously utilize the estimated BEM coefficients $\hat{h}_q(l)$ instead of $\tilde{h}_q(l)$ in Equation (12).

Various example embodiments note that in the above-mentioned step 2, using banded approximation matrix $\overline{H}_K$ instead of the original channel matrix H is to reduce the computational complexity. If the complexity is not an issue, the original channel matrix H in Equation (13) may be used to obtain a better performance than using $\overline{H}_K$.

Various example embodiments note to determine $\sigma$ in practice, Equation (13) may firstly be applied by setting $\sigma=0$, then observe from which SNR the BER curve begins to saturate, and finally choose $\sigma^2$ based on that SNR.

Present Hybrid Iterative Channel Estimation and Equalization (MMSE&IC-MLSE)

Figure 8A:
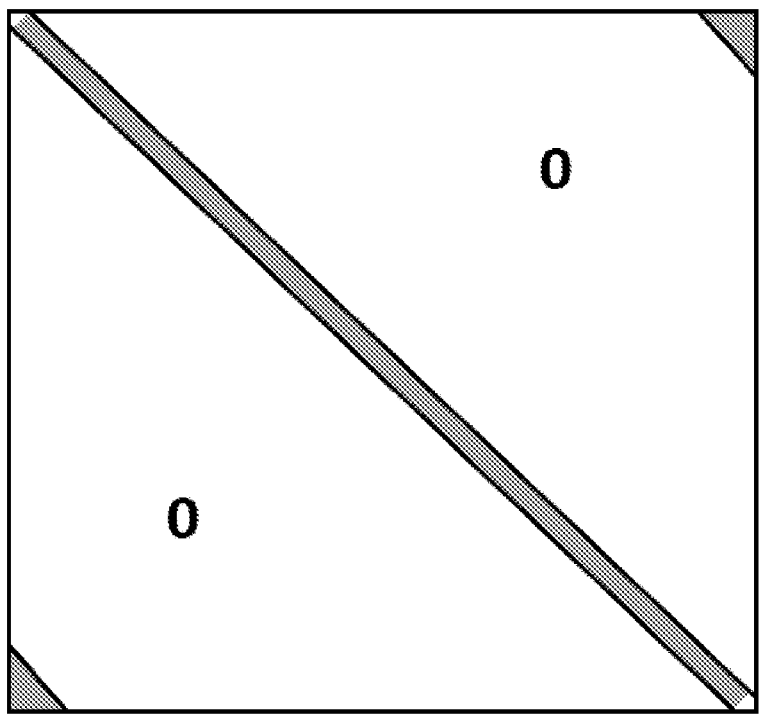
FIGS. 8A and 8B depict the channel matrix H plotted for K=N and K=2N, respectively, for illustrating inter-carrier interference (ICI) in OFDM transmission, according to various example embodiments of the present invention.
Figure 8B:
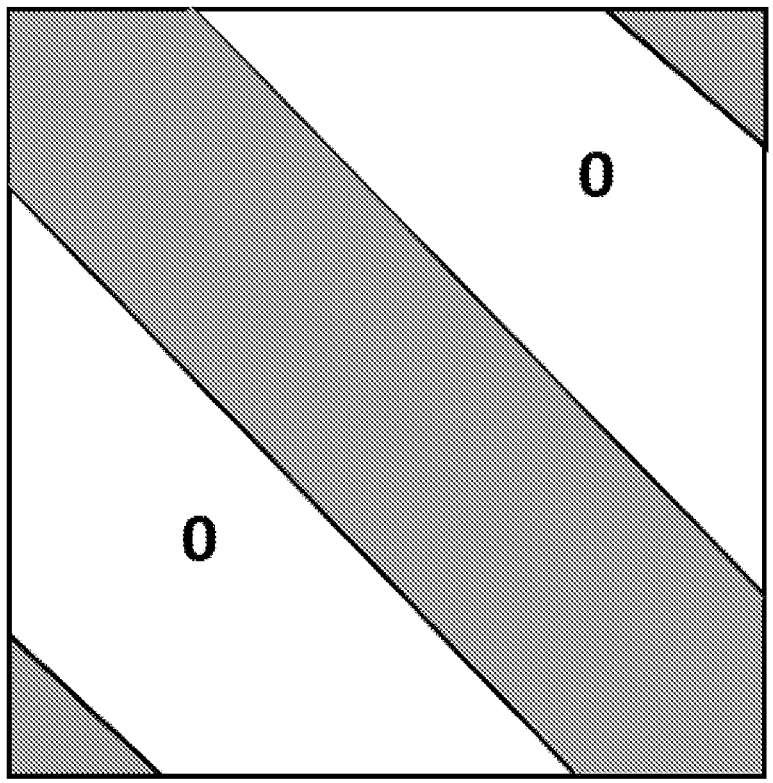

Various example embodiments note that although the MLSE equalizer may be optimal in performance, it can only be used or applied for the special case that K=N. In this regard, various example embodiments found that, for a BEM resolution K>N, inter-carrier interference (ICI) is not limited to the Q subcarrier but may cover the whole OFDM transmission block. To illustrate this, FIGS. 8A and 8B depict the channel matrix H plotted for K=N and K=2N, respectively. In particular, FIG. 8A depicts elements of the channel matrix H for Q=4 and K=4 and FIG. 8B depicts elements of the channel matrix H for Q=4 and K=2N, whereby the gray portions denote non-zero elements.

From FIGS. 8A and 8B, it can be observed that when K=N, H is a banded diagonal matrix and only the main diagonal, Q/2 sub-diagonals, and Q/2 super-diagonals are non-zero. When K=2N, the number of non-zero sub-diagonals and super-diagonals becomes much larger. Various example embodiments found that, as the complexity of Viterbi algorithm grows exponentially with the number of non-zeros sub- and super-diagonals, the MLSE equalizer becomes impractical when K>N. On the other hand, if keeping K=N, for practical channels, this resolution may not be sufficient to model the channel and results in high channel modelling error, which will lead to significant overall performance degradation.

On the other hand, various example embodiments note that, compared with the MLSE equalizer, the complexity of MMSE equalizer is much lower, and the complexity does not change for K>N. However, the MMSE equalizer is sub-optimal in performance. To address the above deficiencies, various example embodiments provide a hybrid MMSE&IC-MLSE equalizer. In this regard, FIG. 9 depicts a schematic block diagram of a hybrid iterative channel estimation and equalization system 900 according to various example embodiments of the present invention.

Figure 9:
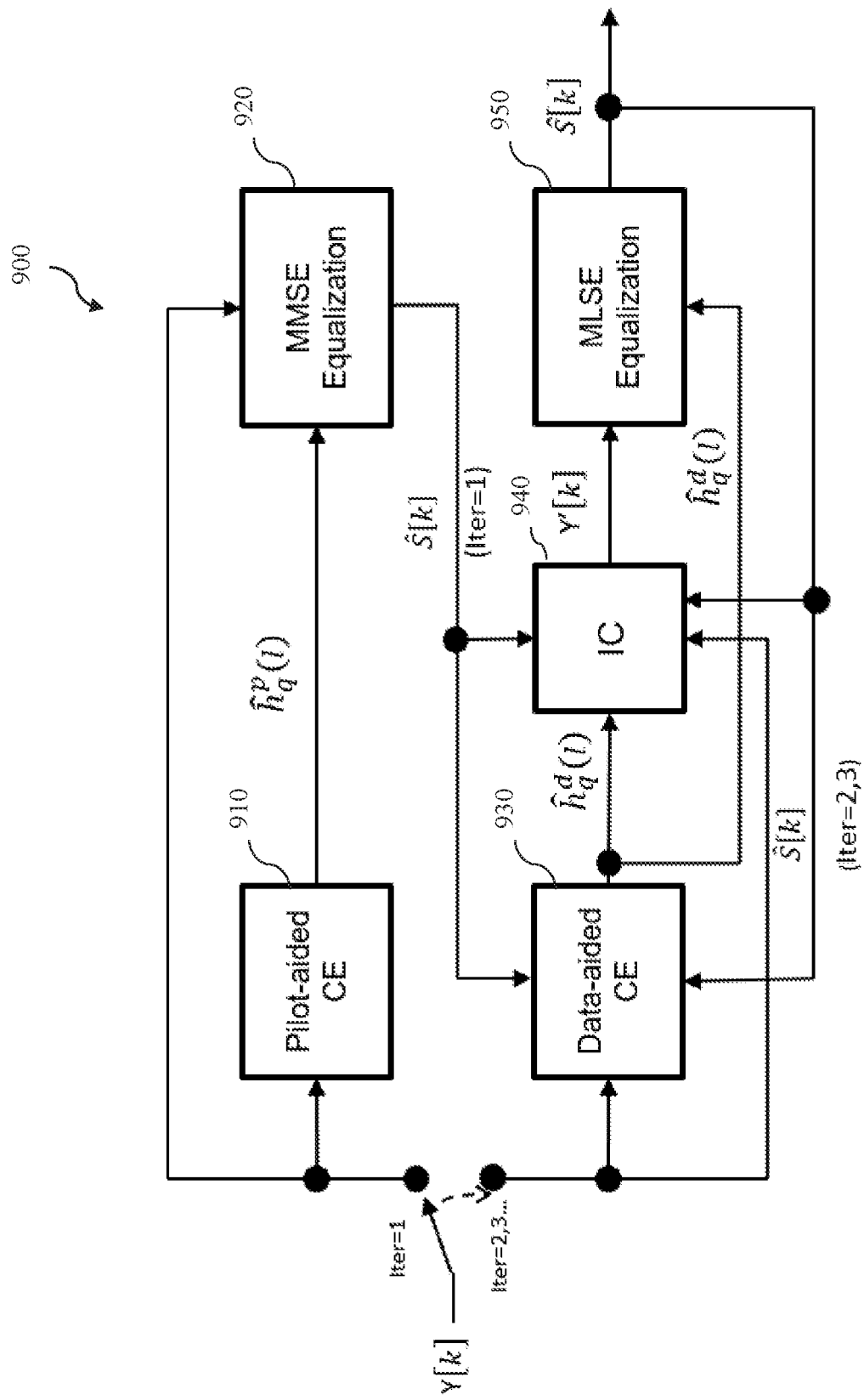
FIG. 9 depicts a schematic block diagram of a channel estimation and equalization system, according to various example embodiments of the present invention.
Figure 10A:
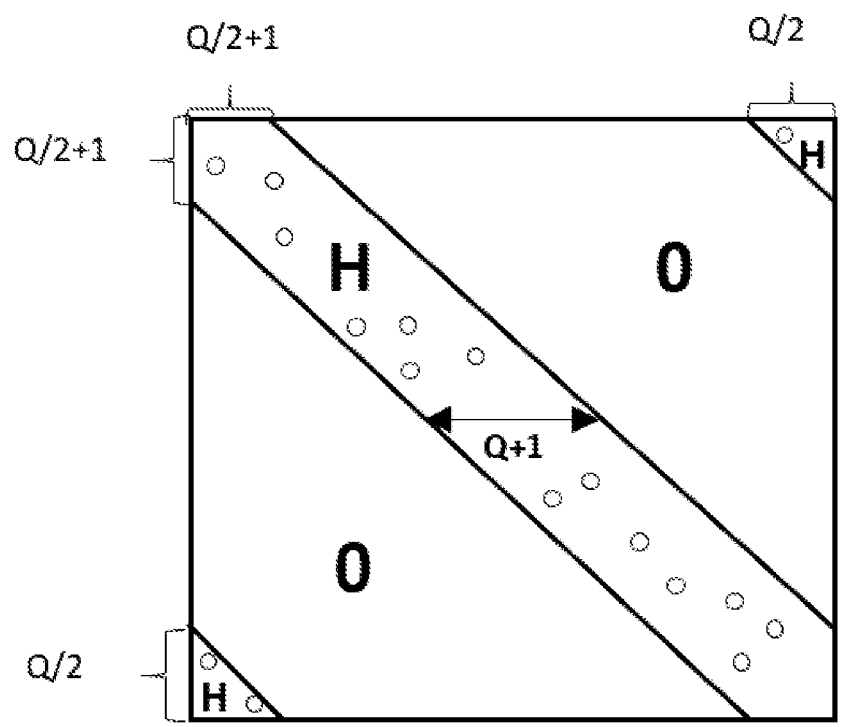
FIGS. 10A and 10B depict example channel matrices $H_b$ (banded diagonal channel matrix) and $H_{IC}$ (complementary channel matrix of $H_b$), respectively, for OFDM transmission, according to various example embodiments of the present invention.

From FIG. 9, it can be seen that there is an interference cancellation (IC) block 940 (e.g., corresponding to the interference removal as described hereinbefore according to various embodiments) before the frequency domain MLSE equalization block 950 (e.g., corresponding to the second equalization as described hereinbefore according to various embodiments). The IC block 940 may be configured to remove the interference from non-significant subcarriers. In various example embodiments, the non-significant subcarrier may correspond to the subcarriers multiplying with 0 when H is a banded diagonal matrix as shown in FIG. 10A. As an example, for the $k^{th}$ subcarrier, all other subcarriers indices from 0 to N−1 except subcarriers indices $$\left( \left| k - \frac{Q}{2} \right|_N, \left| k - \frac{Q}{2} + 1 \right|_N, \ldots, \left| k + \frac{Q}{2} - 1 \right|_N \right),$$

are non-significant subcarriers. For example, $Y[k]=[H_{k,0}, H_{k,1}, \ldots , H_{k,N-1}][S[0], S[1], \ldots S[N-1]]^T$. When H is a banded diagonal matrix as shown in FIG. 10A, $H_{k,0}=0$, $H_{k,1}=0, \ldots , H_{k,N-1}=0$, except $$H_{k,|k-\frac{Q}{2}|_N},$$
$$H_{k,|k-\frac{Q}{2}+1|_N}, \ldots ,$$
$$H_{k,|k+\frac{Q}{2}-1|_N}$$

are non-zero. Correspondingly, $S[0], S[1], \ldots S[N-1]$ are non-significant subcarrier, except $$S\left[\left| k - \frac{Q}{2} \right|_N\right],$$
$$S\left[\left| k - \frac{Q}{2} + 1 \right|_N\right] \ldots ,$$
$$S\left[\left| k + \frac{Q}{2} - 1 \right|_N\right].$$

After interference cancellation, the channel matrix becomes a banded matrix again even when K>N. The IC block 940 will now be described below in further detail, according to various example embodiments of the present invention.

According to Equation (8), the frequency-domain received signal vector Y (e.g., corresponding to the received symbol signal in frequency domain as described hereinbefore according to various embodiments) may be written as:

$$Y=HS+V \quad \text{(Equation 15)}$$

where $$H = \sum_{q=0}^{Q} \sum_{l=0}^{L} \tilde{h}_q(l) F D_q \tilde{Z}_l F^H \quad \text{(Equation 16)}$$

$$= \begin{bmatrix} H_{0,0} & \cdots & H_{0,N-1} \\ \vdots & \ddots & \vdots \\ H_{N-1,0} & \cdots & H_{N-1,N-1} \end{bmatrix}$$

As explained above, when K>N, H is not a banded diagonal channel matrix and the complexity of conventional MLSE may be too large to be applicable. To make the MLSE to be simpler, various example embodiments divide H into two matrices, that is, $H=H_b+H_{IC}$, where $H_b$ is a banded diagonal channel matrix with elements on the $i^{th}$ row and $j^{th}$ column, that is, $H_{b,(i,j)}$, which may be expressed as:

$$H_{b,(i,j)} = \begin{cases} H_{i,j}, & j = \left|i - \frac{Q}{2}\right|_N, \left|i - \frac{Q}{2} + 1\right|_N, \ldots, \left|i + \frac{Q}{2}\right|_N, \\ 0, & \text{otherwise} \end{cases}$$ (Equation 17)

$$i = 0, 1, \ldots, N-1$$

In contrast, $H_{IC}$ is the complementary channel matrix of $H_b$ (which may also be referred to as a non-banded diagonal channel matrix) and it is a matrix with elements on the $i^{th}$ row and $j^{th}$ column, that is, $H_{ic,(i,j)}$, which may be expressed as:

$$H_{ic,(i,j)} = \begin{cases} 0, & j = \left|i - \frac{Q}{2}\right|_N, \left|i - \frac{Q}{2} + 1\right|_N, \ldots, \left|i + \frac{Q}{2}\right|_N, \\ H_{i,j}, & \text{otherwise} \end{cases}$$ (Equation 18)

$$i = 0, 1, \ldots, N-1$$

Figure 10B:
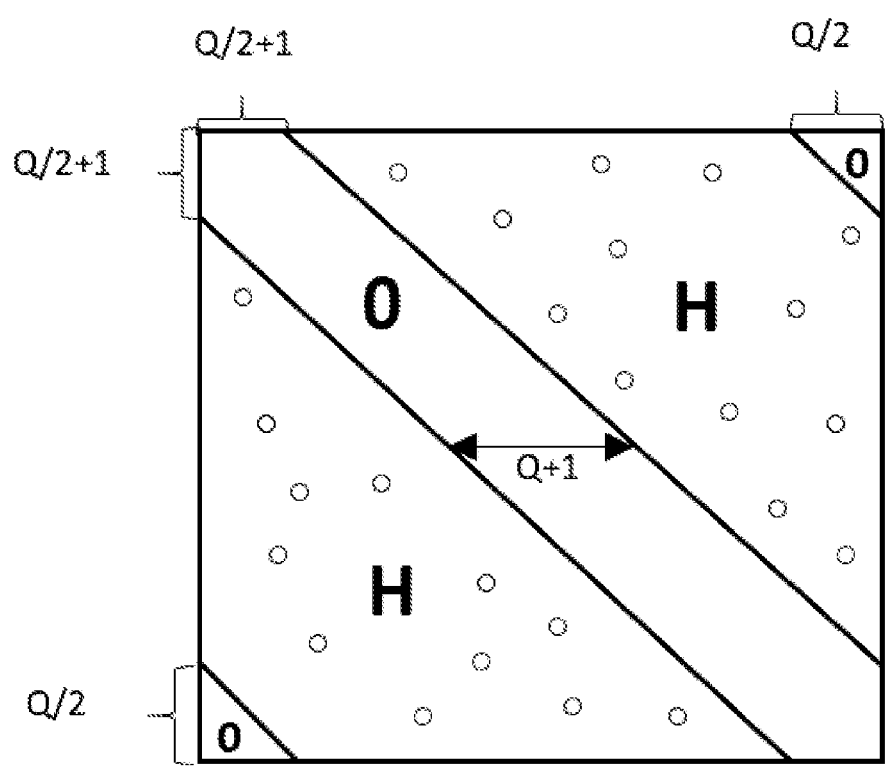

For illustration purpose only, example formats of banded diagonal channel matrix $H_b$ and the complementary channel matrix $H_{IC}$ are shown in FIG. 10A and FIG. 10B, respectively.

Accordingly, Equation (15) may be re-written as:

$$Y = HS + V = H_b S + H_{IC} S + V \quad \text{(Equation 19)}$$

Therefore, the following relationship may be obtained:

$$Y - H_{IC} S = Y' = H_b S + V \quad \text{(Equation 20)}$$

From Equation (20), various example embodiments found that if the interference $H_{IC}S$ is removed from received frequency-domain vector Y, the MLSE equalizer 950 can be used since $H_b$ is a banded diagonal channel matrix. To make the calculation of the received frequency-domain vector after IC, that is, Y', $H_{IC}$ and S are required. In various example embodiments, $H_{IC}$ can be obtained from the CE block 940, and S, since it is unknown, can only be replaced by the detected symbol vector Ŝ. Various example embodiments note that Ŝ is only available after one round of MLSE equalization. Accordingly, in a first iteration (e.g., corresponding to a round of the first channel estimation and the first equalization as described hereinbefore according to various example embodiments), various example embodiments may utilize the conventional MMSE equalization, such as shown in FIG. 9.

Accordingly, the hybrid iterative channel estimation and equalization method according to various example embodiments may include the following steps:

1. Perform a pilot-aided CE 910 (e.g., as described above with reference to the above-mentioned Tang reference) (e.g., corresponding to the first channel estimation as described hereinbefore according to various embodiments) with respect to the DSC based on the received frequency-domain vector Y. The estimated BEM channel coefficient vector produced by the pilot-aided CE 910 may be expressed as $\hat{h}^p = [\hat{h}_0^p(0), \hat{h}_0^p(1), \ldots, \hat{h}_0^p(L), \ldots, \hat{h}_Q^p(0), \hat{h}_Q^p(1), \ldots, \hat{h}_Q^p(L)]^T$ (e.g., corresponding to the plurality of first estimated BEM coefficients as described hereinbefore according to various embodiments) and the reconstructed channel matrix (e.g., corresponding to the first estimated channel matrix as described hereinbefore according to various embodiments) may be expressed as $\hat{H} = \sum_{q=0}^{Q} \sum_{l=0}^{L} \hat{h}_q(l) FD_q \tilde{Z}_l F^H$.

2. Using a MMSE equalizer 920 (e.g., based on Equation 12) to perform a first round of equalization (e.g., corresponding to the first equalization as described hereinbefore according to various embodiments) based on the received frequency-domain vector Y and the estimated BEM channel coefficient vector to produce equalized symbol Ŝ[k] (e.g., corresponding to the plurality of first detected source symbols as described hereinbefore according to various embodiments). In various example embodiments, to achieve better performance, the estimated channel matrix Ĥ may be used without multiplying it with the banded diagonal channel matrix.

3. Pass the equalized symbol Ŝ to the data-aided CE block 930 (e.g., corresponding to the second channel estimation as described hereinbefore according to various embodiments). The estimated channel BEM coefficient vector (e.g., corresponding to the plurality of second estimated BEM coefficients as described hereinbefore according to various embodiments) produced by the data-aided CE block 930 based on the received frequency-domain vector Y and the equalized symbol Ŝ (which may also be referred to as detected source symbols) may be given by:

$$\hat{h}^d = [\hat{h}_0^d(0), \hat{h}_0^d(1), \ldots, \hat{h}_0^d(L), \ldots, \hat{h}_Q^d(0), \hat{h}_Q^d(1), \ldots, \hat{h}_Q^d(L)]^T = (\bar{S}^H \bar{S})^{-1} \bar{S}^H Y \quad \text{(Equation 21)}$$

where $\bar{S}$ is a $N \times (Q+1)(L+1)$ matrix with the $((Q+1)l+q)^{th}$ column equals to $FD_q \tilde{Z}_l F^H \hat{S}$. In various example embodiments, the detected source symbols input to the data-aided CE block 930 may be the detected source symbols from the MMSE equalizer 920 in a first round or iteration (e.g., iteration 1 in FIG. 9) or the detected source symbol from the MLSE equalizer 950 in subsequent round(s) or iteration(s) (e.g., iterations 2, 3 and so on in FIG. 9) from the MLSE equalizer 950).

4. The IC block 940 may be configured to make reconstruction of the channel matrix Ĥ again (e.g., corresponding to the second estimated channel matrix as described hereinbefore according to various embodiments). The IC block 940 may be further configured to divide or decompose Ĥ into $\hat{H} = \hat{H}_b + \hat{H}_{IC}$, where $\hat{H}_b$ and $\hat{H}_{IC}$ are the estimated $H_b$ and $H_{IC}$ as described before. The IC block 940 may be configured to then calculate Y' based on detected source symbols (e.g., the detected source symbols from the MMSE equalizer 920 in a first round or iteration (e.g., iteration 1 in FIG. 9) or the detected source symbol from the MLSE equalizer 950 in subsequent round(s) or iteration(s) (e.g., iterations 2, 3 and so on in FIG. 9) from the MLSE equalizer 950) and $\hat{H}_{IC}$ (e.g., corresponding to the performing interference removal as described hereinbefore according to various embodiments), such as by $$Y' = Y - \hat{H}_{IC} \hat{S} \quad \text{(Equation 22)}$$

Pass the interference reduced symbol signal Y' to the MLSE equalizer 950 configured to perform MLSE equalization based on the interference reduced symbol signal Y' and the estimated channel BEM coefficient vector from the data-aided CE block 930.

5. For the MLSE equalizer 950 (e.g., based on the conventional MLSE equalizer as described hereinbefore), start from the $0^{th}$ subcarrier. For each state $s_0(i)$, $i \in \{0, 1, \ldots, M^{Q-1}\}$, initialize the accumulated metric as $\Gamma(s_0(i)) = 0$.

6. For each $s_{k-1}(j_m)$, $m \in \{0, 1, \ldots, M-1\}$, compute the branch metric by:

$$\gamma(s_{k-1}(j_m) \to s_k(i)) = \left| Y'[k] - \sum_{q=0}^{Q} \hat{H}_{k,\left|k-\frac{Q}{2}+q\right|_N} S_{j_m,i}[q] \right|^2 \quad \text{(Equation 23)}$$

7. Calculate the accumulated metric of the $k^{th}$ subcarrier by Equation (11).
8. Keep the preceding state $j_m$ which leads to minimum $\Gamma(s_k(i))$ in a table.
9. Set $k \leftarrow k+1$ and go back to step 6 or go to step 10 if $k=N$.
10. Find the most likely transmitted sequence $\hat{S}$ recursively by tracing back from the state with minimum accumulated metric $\Gamma(s_{N-1}(i))$.
11. Go back to step 3 for the next round of CE and equalization, or stop if the maximum round or iteration number is reached.

Iterative Channel Estimation and Data Equalization with FEC

Figure 11:
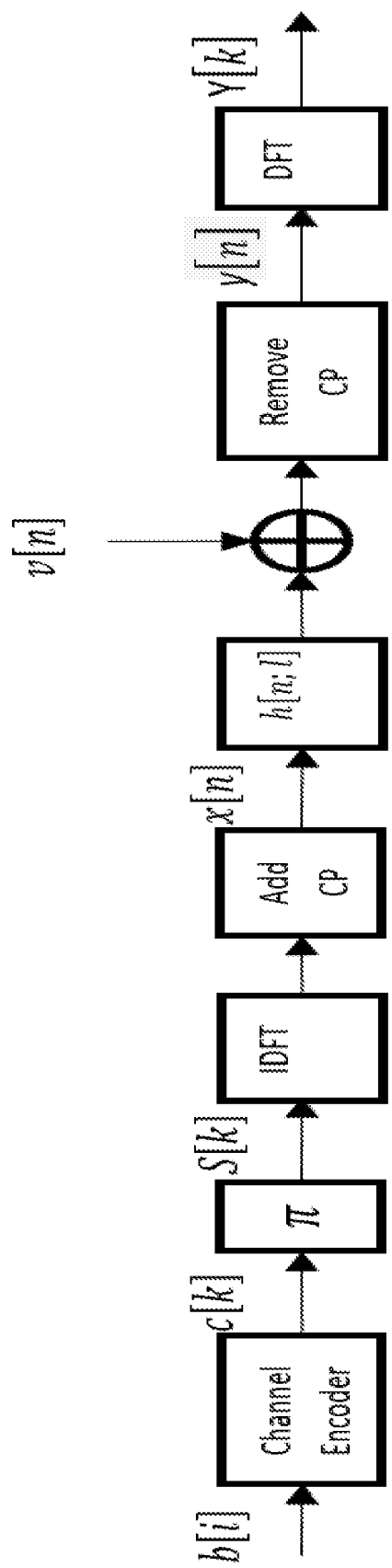
FIG. 11 depicts a schematic block diagram of OFDM transmission with forward error correction (FEC), according to various example embodiments.

Various example embodiments further consider the situation that an error correction code, such as a forward error correction (FEC) code, is used after the equalizer for error correction. FIG. 11 depicts a schematic block diagram of the OFDM transmission with FEC, according to various example embodiments. It can be observed that when FEC is used, at the transmitter side, the source bit $b[i] \in \{0,1\}$ may be encoded by a channel encoder, and the encoded bit may be $c[k] \in \{0,1\}$. The encoded bits may then pass through an interleaver and the interleaved bits are mapped to source symbol $S[k] \in \{0,1, \ldots, M-1\}$. After that, the processing may be the same as that described and shown in FIG. 6.

Figure 12:
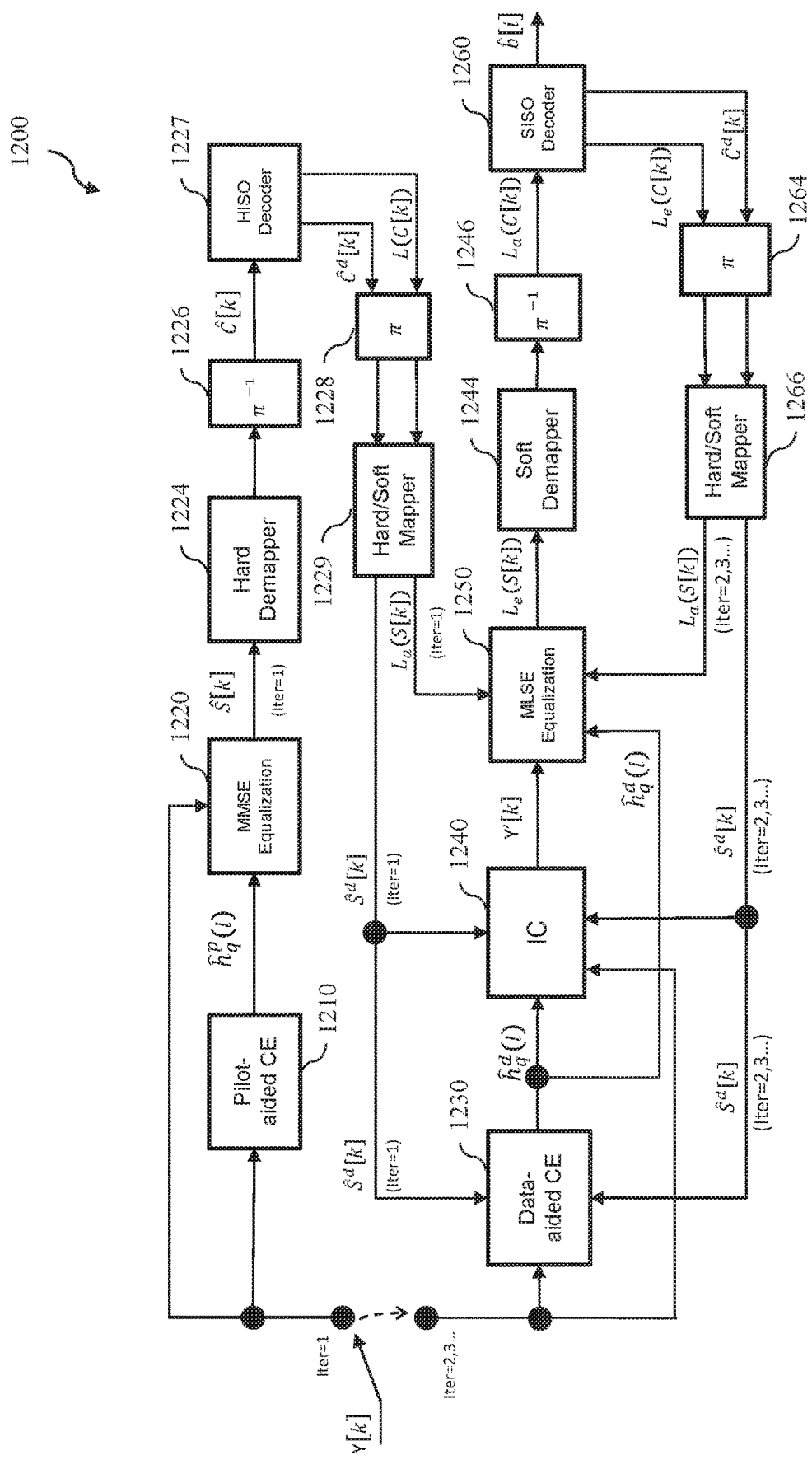
FIG. 12 depicts a schematic block diagram of a channel estimation and equalization system with FEC, according to various example embodiments of the present invention.

FIG. 12 depicts a schematic block diagram of the hybrid iterative channel estimation and data equalization system with FEC 1200, according to various example embodiments of the present invention.

As shown in FIG. 12, the MLSE equalizer 1250 (e.g., corresponding the second equalization as described hereinbefore according to various embodiments) may be configured to use a soft-output Viterbi algorithm (SOVA) (e.g., as described in Hagenauer et al., "A Viterbi algorithm with soft-decision outputs and its applications," in Proc. Globecom, Dallas, TX, November 1989, pp. 1680-1686 or Ling et al., "On SOVA for Nonbinary Codes", IEEE Communications Letters, vol. 3, no. 12, pp. 335-337, December 1999) to calculate L(S[k]), which is the log-likelihood ratio (LLR) of each detected symbol $\hat{S}[k]$. After that, the extrinsic information $L_e$ (S[k])=L(S[k])–$L_a$(S[k]) (e.g., corresponding the plurality of second detected coded source symbols as described hereinbefore according to various embodiments), is soft-demapped (e.g., by the soft demapping block 1244) and deinterleaved (e.g., by the deinterleaving block 1246) to become the a priori information of the coded bit, that is, $L_a$(C[k]) (e.g., corresponding the plurality of second detected coded bits as described hereinbefore according to various embodiments). The channel decoder 1260 (e.g., corresponding the soft decoding the plurality of second detected coded bits and hard decoding the plurality of second detected coded bits as described hereinbefore according to various embodiments) may be a soft-input soft-output (SISO) decoder which takes the a priori information of the coded bits $L_a$(C[k]) as input and provides LLR, L(C[k]), of each coded bit C[k]. In the iterative channel estimation and data equalization method with FEC according to various example embodiments, the FEC code may be a rate ½ convolutional code with generator polynomial (133, 171), and the SISO algorithm used by the channel decoder 1260 may also be SOVA. After channel decoding, the extrinsic information $L_e$(C [k])=L(C [k])–$L_a$(C [k]) (e.g., corresponding the plurality of second soft coded bits (i.e., soft coded bits obtained after the soft decoding) as described hereinbefore according to various embodiments), is interleaved (e.g., by the interleaving block 1264), soft-mapped (e.g., by the hard/soft mapping block 1266) and fed back to the MLSE equalizer 1250 as the a priori information $L_a$(S[k]) (e.g., corresponding to the plurality of second detected soft decoded source symbols as described hereinbefore according to various embodiments) of the source symbol S[k] for the next round of equalization. Meanwhile, the coded bits after error correction, i.e., $\hat{C}^d$[k] (e.g., corresponding the plurality of second hard coded bits (i.e., hard coded bits obtained after the hard decoding) as described hereinbefore according to various embodiments), is interleaved (e.g., by the interleaving block 1264) and hard mapped (e.g., by the hard/soft mapping block 1266) to $\hat{s}^d$[k] (e.g., corresponding to the plurality of second detected hard decoded source symbols as described hereinbefore according to various embodiments) and fed back to the data-aided CE 1230 (e.g., corresponding the second channel estimation as described hereinbefore according to various embodiments) and IC blocks 1240 (e.g., corresponding the interference removal as described hereinbefore according to various embodiments) to perform channel estimation and interference cancellation, respectively. In various example embodiments, the hard coded bits may be obtained by making hard-decision of soft coded bits. For example, if $p(b=0) > p(b=1)$, $b=0$, otherwise $b=1$. The iterative channel estimation and data equalization method with FEC 1200 will now be described in further detail below according to various example embodiments.

The pilot-aided CE block 1210 (e.g., corresponding to the first channel estimation as described hereinbefore according to various embodiments) may be configured to output the estimated BEM coefficients $\hat{h}_q^p(l)$ (e.g., corresponding to the plurality of first estimated BEM coefficients as described hereinbefore according to various embodiments) with respect to the DSC based on the received frequency-domain vector Y, such as in the same or similar manner as the pilot-aided CE block 910. The MMSE equalization 1220 (e.g., corresponding to the first equalization as described hereinbefore according to various embodiments) may be configured to produce the equalized symbols ŝ[k] (e.g., corresponding to the plurality of first detected source symbols as described hereinbefore according to various embodiments) based on the received frequency-domain vector Y and the estimated BEM channel coefficients, which may be obtained by Equation (14). The equalized symbols ŝ[k] may then be hard-demapped (e.g., by the hard demapping block 1224) and deinterleaved (e.g., by the deinterleaving block 1226) to produce detected coded bits Ĉ[k] (e.g., corresponding the plurality of first detected coded bits as described hereinbefore according to various embodiments). The HISO decoder 1227 may be configured to produce the hard coded bits (e.g., corresponding the plurality of first hard coded bits (i.e., hard coded bits obtained after the hard decoding) as described hereinbefore according to various embodiments) $\hat{C}^d$[k] after error correction and soft coded bits L(C [k]) (e.g., corresponding to the plurality of first soft coded bits (i.e., soft coded bits obtained after the soft decoding) as described hereinbefore according to various embodiments), which may be obtained by channel decoding algorithms depending on error-correction codes used. By way of an example only and without limitation, when convolutional code is used, the hard coded bits and the soft coded bits may be obtained by SOVA algorithm, as mentioned hereinbefore. The hard coded bits $\hat{C}^d[k]$, after interleaving (e.g., by the interleaving block 1228) and hard mapping (e.g., by the hard/soft mapping block 1229), becomes the detected symbol after error correction $\hat{s}^d[k]$ (e.g., corresponding to the plurality of first detected hard decoded source symbols as described hereinbefore according to various embodiments). The soft coded bits L(C [k]), after interleaving (e.g., by the interleaving block 1228) and soft mapping (e.g., by the hard/soft mapping block 1229), becomes the a priori information $L_a(S[k])$ (e.g., corresponding to the plurality of first detected soft decoded source symbols as described hereinbefore according to various embodiments).

The data-aided CE block 1230 may be configured to produce the estimated BEM coefficients $\hat{h}_q^d(l)$ (e.g., corresponding the plurality of second estimated BEM coefficients as described hereinbefore according to various embodiments) based on the received frequency-domain vector Y and detected hard decoded source symbols (e.g., the detected hard decoded source symbols based on the MMSE equalizer 1220 in a first round or iteration (e.g., iteration 1 in FIG. 12) or the detected hard decoded source symbols based on the MLSE equalizer 1250 in subsequent round(s) or iteration(s) (e.g., iterations 2, 3 and so on in FIG. 12), which may be obtained based on Equation (21).

The IC block 1240 may be configured to produce an interference reduced symbol signal Y', which may be obtained by Equation (22). In particular, the IC block 1240 may be configured to make reconstruction of the channel matrix $\hat{H}$ again (e.g., corresponding to the second estimated channel matrix as described hereinbefore according to various embodiments). The IC block 1240 may be further configured to divide or decompose $\hat{H}$ into $\hat{H}=\hat{H}_b+\hat{H}_{IC}$, where $\hat{H}_b$ and $\hat{H}_{IC}$ are the estimated $H_b$ and $H_{IC}$ as described before. The IC block 1240 may be configured to then calculate the interference reduced symbol signal Y' based on detected hard decoded source symbols (e.g., the detected hard decoded source symbols based on the MMSE equalizer 1220 in a first round or iteration (e.g., iteration 1 in FIG. 12) or the detected hard decoded source symbols based on the MLSE equalizer 1250 in subsequent round(s) or iteration(s) (e.g., iterations 2, 3 and so on in FIG. 12) and $\hat{H}_{IC}$ (e.g., corresponding to the performing interference removal as described hereinbefore according to various embodiments), such as by Equation (22).

The MLSE equalization block 1250 may be configured to produce the extrinsic information $L_e$ $(S[k])=L(S[k])-L_a(S[k])$ based on the interference reduced symbol signal Y' and the estimated BEM coefficients $\hat{h}_q^d(l)$. In various example embodiments, the MLSE equalization block 1250 may be further configured to produce the extrinsic information $L_e(S[k])=L(S[k])-L_a(S[k])$ based on detected soft decoded source symbols (e.g., the detected soft decoded source symbols based on the MMSE equalizer 1220 in a first round or iteration (e.g., iteration 1 in FIG. 12) or the detected soft decoded source symbols based on the MLSE equalizer 1250 in subsequent round(s) or iteration(s) (e.g., iterations 2, 3 and so on in FIG. 12). For example, L(S[k]) may be obtained by the SOVA algorithm, as mentioned hereinbefore. The SISO decoder 1260 may be configured to produce the hard coded bits after error correction $\hat{C}^d[k]$ and the extrinsic information $L_e$ (C [k])=L(C [k])−$L_a$ (C [k]). For example, $\hat{C}^d[k]$ and L(C[k]) may be obtained using channel decoding algorithms depending on error-correction codes used. By way of an example only and without limitation, when convolutional code is used, $\hat{C}^d[k]$ and L(C [k]) may be obtained using the SOVA algorithm, as mentioned hereinbefore. The hard coded bits $\hat{C}^d[k]$, after interleaving and hard mapping, becomes the detected symbol after error correction $\hat{s}^d$ [k]. The extrinsic information $L_e$ (C [k]), after interleaving and soft mapping, becomes the a priori information $L_a(S[k])$. As mentioned hereinbefore, "hard" and "soft" can be understood by a person skilled in the art. For example, a hard value may refer to a binary value (e.g., C[k]=0 or 1) and a soft value may refer to a log-likelihood ratio $$\left(\text{e.g., } L(C[k]) = \ln \frac{P(C[k] = 0)}{P(C[k] = 1)}\right).$$

In the first round of iteration, since the MMSE equalizer 1220 is used, only hard-output $\hat{S}[k]$ may be provided to the channel decoder 1227 and the channel decoder 1227 may be an hard-input soft-output (HISO) decoder.

Improve the Performance of Channel Estimation by Using Inter-Frame Channel Interpolation Various example embodiments note that when using BEM channel model, the estimated channel gains by using pilot symbols are more accurate in the middle of each frame than the beginning and end of each frame. Accordingly, various example embodiments improve the performance of the channel estimation, by using inter-frame channel interpolation. In various example embodiments, the estimated channel gains in middle of each frame as known channel gains may be obtained and used for polynomial interpolation to estimate channel gains at a beginning portion and an end portion of the transmission frame. In various example embodiments, polynomial interpolation may determine a polynomial f[n;l] (e.g., corresponding to the inter-frame channel interpolation polynomial function as described hereinbefore according to various embodiments) to represent the channel gains of the $l^{th}$ path at time index n. Suppose the degree of f[n;l] is d, then f[n;l] may be written as:

$$f[n;l]=u_l(0)+nu_l(1)+n^2u_l(2)+\ldots+n^d u_l(d) \quad \text{(Equation 24)}$$

The target is to minimize the MSE between f[n;l] and the $N_h$ known channel coefficients $h[n_i;l]$, i=1, 2, ... $N_h$, that is:

$$R^2=\Sigma_{i=1}^{N_h}|f[n_i;l]-h[n_i;l]|^2 \quad \text{(Equation 25)}$$

To minimize $R^2$, least square (LS) fitting method may be used according to various example embodiments. According to Equation (24), the following may be obtained:

$$\begin{bmatrix} 1 & n_1 & \ldots & n_1^d \\ 1 & n_2 & \ldots & n_2^d \\ \vdots & \vdots & \ddots & \vdots \\ 1 & n_{N_h} & \ldots & n_{N_h}^d \end{bmatrix} \begin{bmatrix} u_l(0) \\ u_l(1) \\ \vdots \\ u_l(d) \end{bmatrix} = \begin{bmatrix} f[n_1;l] \\ f[n_2;l] \\ \vdots \\ f[n_{N_h};l] \end{bmatrix} \quad \text{(Equation 26)}$$

Let $$B = \begin{bmatrix} 1 & n_1 & \ldots & n_1^d \\ 1 & n_2 & \ldots & n_2^d \\ \vdots & \vdots & \ddots & \vdots \\ 1 & n_{N_h} & \ldots & n_{N_h}^d \end{bmatrix}, \quad \text{(Equation 27)}$$

$u_l = [u_l(0), u_l(1), \ldots, u_l(d)]^T$ and $h_l = [h[n_1]; h[n_2; 1], \ldots, h[n_{N_h}; 1]]^T$, according to LS fitting, the following may be obtained:

$$u_l = (B^H B)^{-1} B \cdot h_l \quad \text{(Equation 28)}$$

After $u_l$ (which may be referred to as polynomial interpolation coefficients) is obtained, it may then be used to calculate $f[n;l]$, $n=0, 1, \ldots, N-1$.

Optimal Power Allocation Between the Data and the Pilots

In practical communication systems, there is a power constraint on the transmission block which comprises both the data symbols as well as the pilot symbols used for CE. Various example embodiments note that an optimal allocation of power between the data and the pilots can improve the overall system performance. Specifically, it may be desirable for the hybrid iterative channel estimation and data equalization method according to various example embodiments to have a good initial CE as its starting point. In this regard, providing more power to the pilots can improve the initial CE, but leaves relatively lesser power for the data symbols. Thus, although the CE is good, the BER performance may deteriorate because the data power is reduced. Therefore, various example embodiments may determine an optimal allocation of power between data symbols and pilot symbols so that the system BER is minimized.

According to various example embodiments, it may be assumed that the total transmission power over a block is $P_T$, and is divided between the data and the pilots as $\alpha P_T$ and $(1-\alpha) P_T$ respectively, where $\alpha \in \{0,1\}$ is the power allocation factor. In other words, $\alpha$ is defined as the ratio of the power allocated to the data blocks to the power in the entire transmission block. For equal number of data (or pilot) symbols per sub-block (single impulse pilot per sub-block in our case), it can be verified that the SNR per data symbol as well as the SNR per pilot symbol are the same if $$\alpha = \frac{n_d}{n_d + 1}$$

where $n_d$ denotes the number of data symbols in a single sub-block. If $$\alpha < \frac{n_d}{n_d + 1},$$

every pilot sample is allocated more power compared to every data sample, and vice-versa. Accordingly, various example embodiments determine the optimal value of $\alpha$ to minimize the system BER. In this regard, BER is the final desired performance metric, and is a function of the CE as well as the power of the data symbols.

In contrast, in various conventional iterative estimation techniques in the literature, the overall transmitted power may be allocated equally or in fixed (non-optimal) ratio between the data and the pilots. However, various example embodiments note that such approaches may result in sub-optimal system performance. In the power allocation approach for the hybrid iterative channel estimation and data equalization method according to various example embodiments, it may be difficult to find the optimal closed-form power expression for BER minimization due to its iterative nature. Accordingly, various example embodiments determine a near-optimal power allocation using prior training (before the actual transmission starts), assuming that the channel statistics remain unchanged for a sufficiently long duration.

Simulation Results

Various simulation results for the hybrid iterative channel estimation and equalization method according to various example embodiments over a DSC will now be described. In the simulation conducted, the modulation scheme is Quadrature-phase shift keying (QPSK). The transmission bandwidth is 7.68 MHz. The FFT size is N=512. The DSC is of order L=3, that is, four multipaths are considered. Each channel tap is simulated as an independent and identically distributed (i.i.d.) random variable correlated in time according to Jakes' model with the correlation function given as $J_0$ $(2\pi n f_{max} T_s)$, which is the zeroth-order Bessel function of the first kind. The average total power of the 4 paths is normalized to 1. The vehicle speed is 500 km/h and the carrier frequency $f_c=2$ or 20 GHz, which leads to normalized Doppler spread $f_{max} T_s N = 0.062$ or 0.62, respectively. For the BEM model, K=2N and Q=4 was used. Using non-uniformly spaced frequencies, Q can be reduced from 4 to 2. For simplicity, various example embodiments assume uniformly spaced frequencies and Q=4. The length of the pilot cluster is 2Q+1=9 and the number of sub-blocks is L+1=4. Therefore, the efficiency of the transmission is 93%.

Firstly, the BER performance under different power allocation schemes was analyzed. The BERs obtained by the hybrid iterative channel estimation and equalization (MMSE&IC-MLSE) method according to various example embodiments with different values of $\alpha$ are plotted. In the comparisons, it was assumed that the SNR is 20 dB and there is no FEC.

Figure 13:
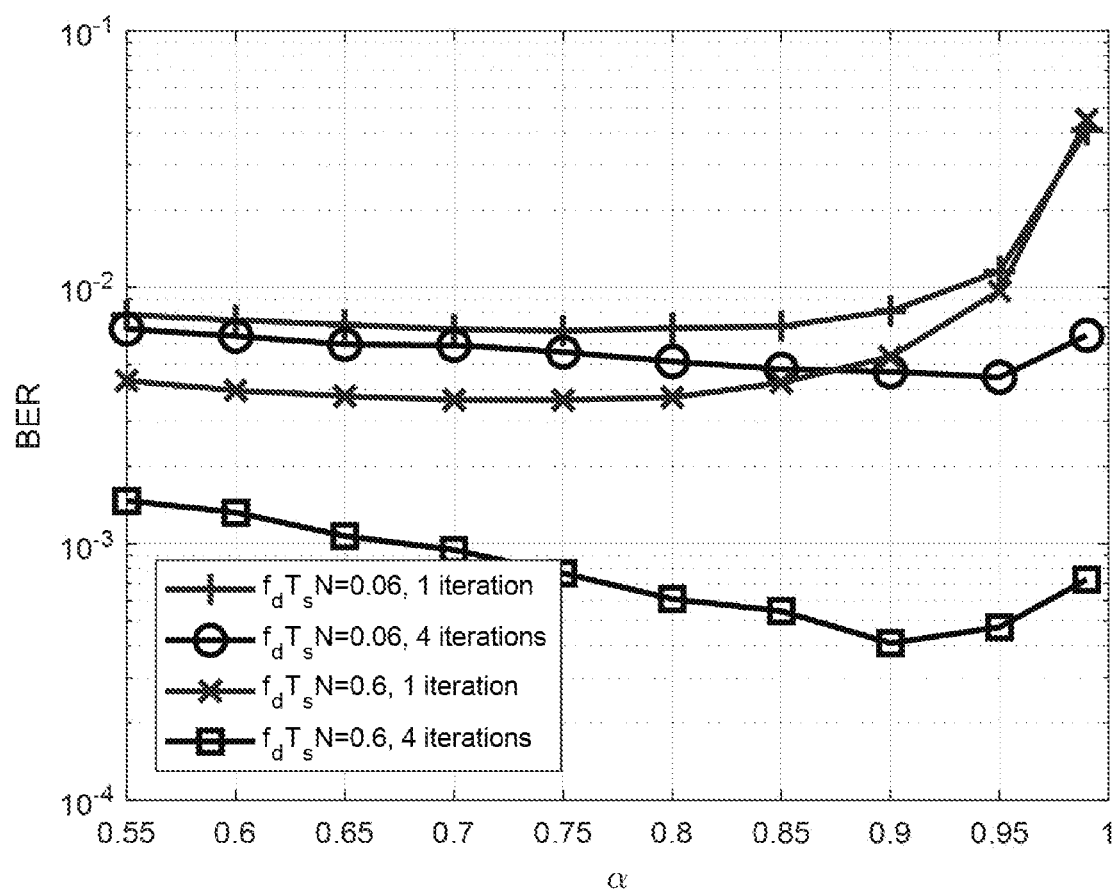
FIG. 13 depicts a plot of BER versus the values of α (Es/No=20 dB) of a channel estimation and equalization method, according to various example embodiments.

FIG. 13 depicts a plot of BER versus the values of $\alpha$ (Es/No=20 dB). From FIG. 13, it can be observed that $\alpha=0.9$ is a good choice for both low Doppler ($f_{max} T_s N = 0.062$) and high Doppler ($f_{max} T_s N = 0.62$) scenarios. Therefore, all the following simulation results of the hybrid iterative channel estimation and equalization method according to various example embodiments are obtained under the condition that $\alpha = 0.9$.

Figure 14:
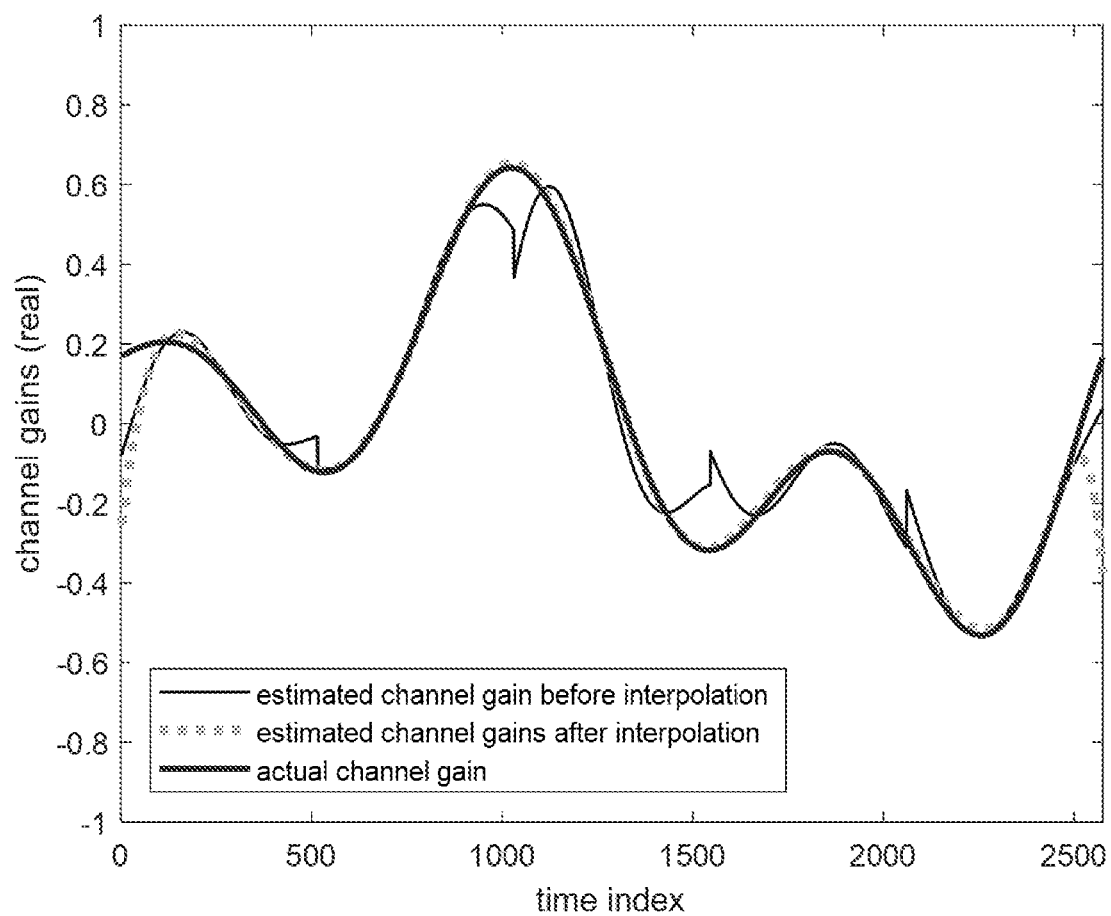
FIG. 14 depicts a plot comparing channel gains with inter-frame channel interpolation, channel gains without inter-frame channel interpolation and actual channel gains, according to various example embodiments of the present invention.

Subsequently, the performance of the inter-frame interpolation was analyzed. In the simulation, it was assumed that the interleaver length is 5120 bits, which includes 5 OFDM frames, that is, the inter-frame interpolation was performed each time for 5 frames. In each frame, the channel gains were taken from time index 51 to 462 as the known channel gains, and the first and last 50 channel gains as unknown. Hence, the total number of known channel gains is $N_h = 2060$. The index $k_i$, $i=1, 2, \ldots N_h$ are [51, 52, …, 461, 462, 563, 564, …, 973, 974, 1075, 1076, …, 1485, 1486, 1587, 1588, …, 1997, 1998, 2099, 2100, …, 2509, 2510]. The polynomial degree was set to d=13. After obtaining $u_1$ by using Equation (28), the channel gains after interpolation for k=1, 2, …, 2560 were calculated by using Equation (24). In FIG. 14, the channel gains after interpolation are compared with those obtained without inter-frame interpolation.

FIG. 14 depicts a plot comparing channel gains estimated by pilots with channel gains after interpolation (frame length=512, SNR=20 dB, d=13, interleaver length=5120 bits). From FIG. 14, it can be observed that after interpolation, the estimated channel gains approach the actual channel gain more closely, except in the beginning and end of the 2560 symbols. Accordingly, in various example embodiments, the channel gains after interpolation was used to replace the channel gains estimated by using pilot symbols, except the first and last 100 symbols. Accordingly, the estimated channel gains in at least one of a beginning portion and an end portion of the frame may be modified based on the inter-frame channel interpolation polynomial function.

Furthermore, the MSE of the channel estimation and BER of the equalization obtained by using convention methods and the MMSE&IC-MLSE method were computed and compared. The MSE for the $l^{th}$ channel tap was computed as:

$$MSE(l) = \frac{1}{IN}\sum_{i=1}^{I}\sum_{n=0}^{N-1}|h^{(i)}[n;l] - \hat{h}^{(i)}[n;l]|^2 \quad \text{(Equation 29)}$$

where I and N denote the number of transmission blocks and length of each block respectively. $\hat{h}^{(i)}[n;l]=\sum_{q=0}^{Q}\hat{h}_q^{(i)}(l)e^{j\omega_q n}$ is the estimated time domain channel coefficients of the $i^{th}$ block obtained from the estimated BEM coefficient $\hat{h}_q^{(i)}(l)$.

The lower bound of MSE is obtained by performing data-aided CE by using perfectly known source symbols, that is, $\tilde{h}=(\tilde{S}^H\tilde{S})^{-1}\tilde{S}^H Y$, where $\tilde{S}$ is a $N\times(Q+1)(L+1)$ matrix with the $((Q+1)l+q)^{th}$ column equals to $FD_q\tilde{Z}_l F^H S$. After the BEM coefficient vector $\tilde{h}$ is obtained, the time domain channel coefficients $\tilde{h}(n;l)$ can be calculated by Equation (2) and the lower bound MSE can be calculated accordingly by Equation (29).

The lower bound of BER is obtained by performing IC-MLSE only one time, and the IC and MLSE are based on the assumption that the channel state information (CSI) is perfectly known. When channel is perfectly known, the channel matrix H is given by:

$$H=\sum_{l=0}^{L}FD_h\tilde{Z}_l F^H \quad (30)$$

where $D_h$ is a N×N diagonal matrix with the diagonal elements equal to the time domain channel coefficients, that is, $D_h=\text{diag}\{[h(0;l), h(1;l), \ldots, h(N-1;l)]^T\}$. H was then divided into $H_b$ and $H_{IC}$ and the IC under perfect CSI was performed by $Y''=Y-H_{IC}S$.

Figure 15A:
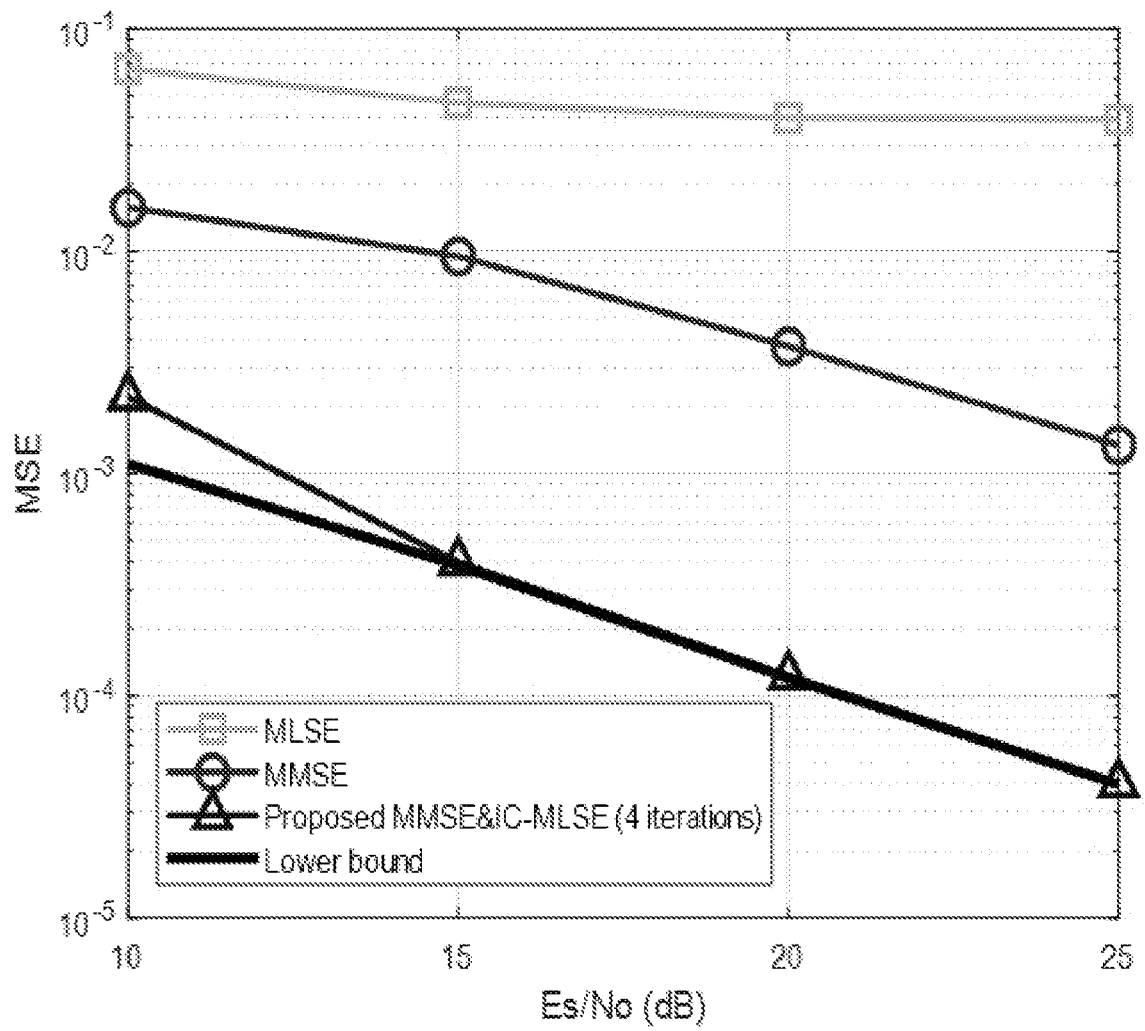
FIG. 15A depicts a plot of the mean-square error (MSE) of the channel estimation without FEC, according to various example embodiments of the present invention.
Figure 15B:
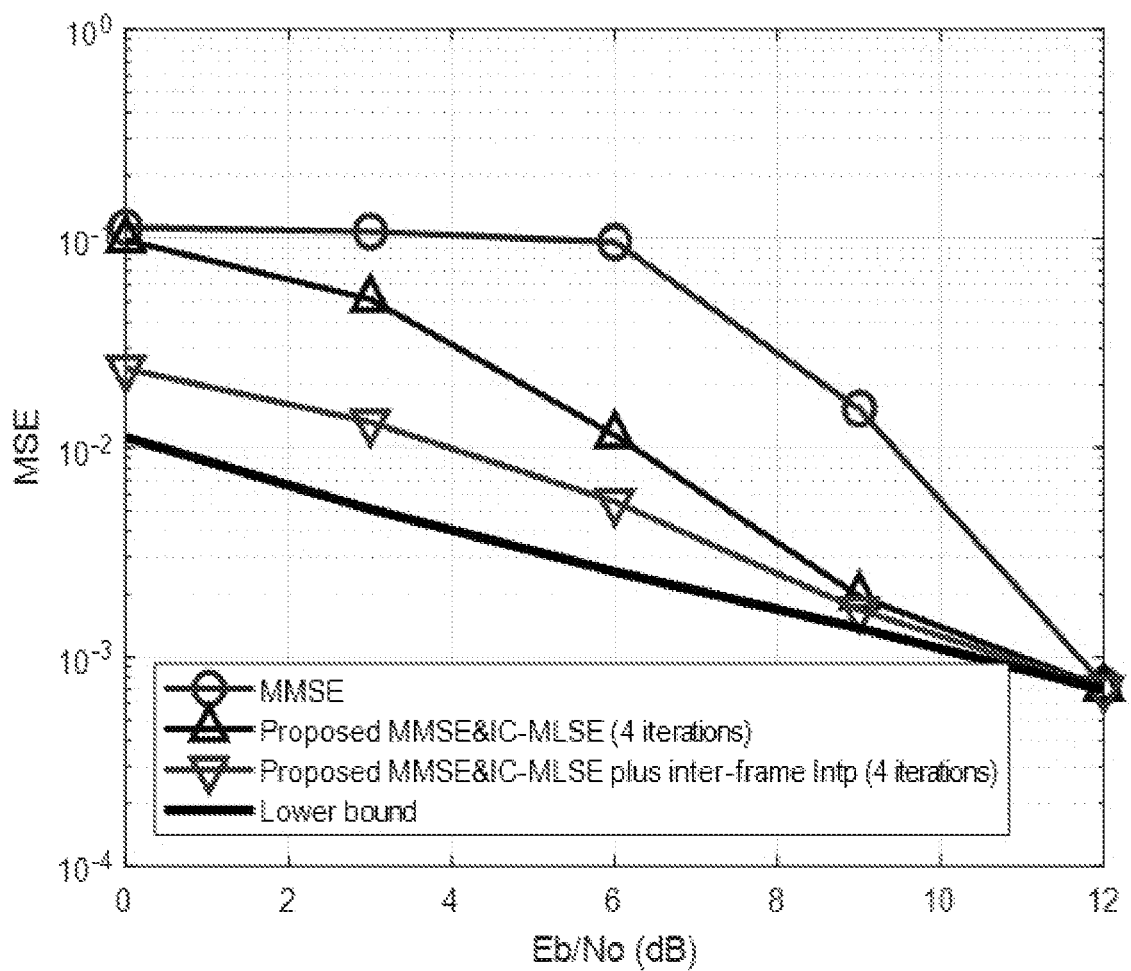
FIG. 15B depicts a plot of the MSE of the channel estimation with FEC, according to various example embodiments of the present invention.
Figure 16A:
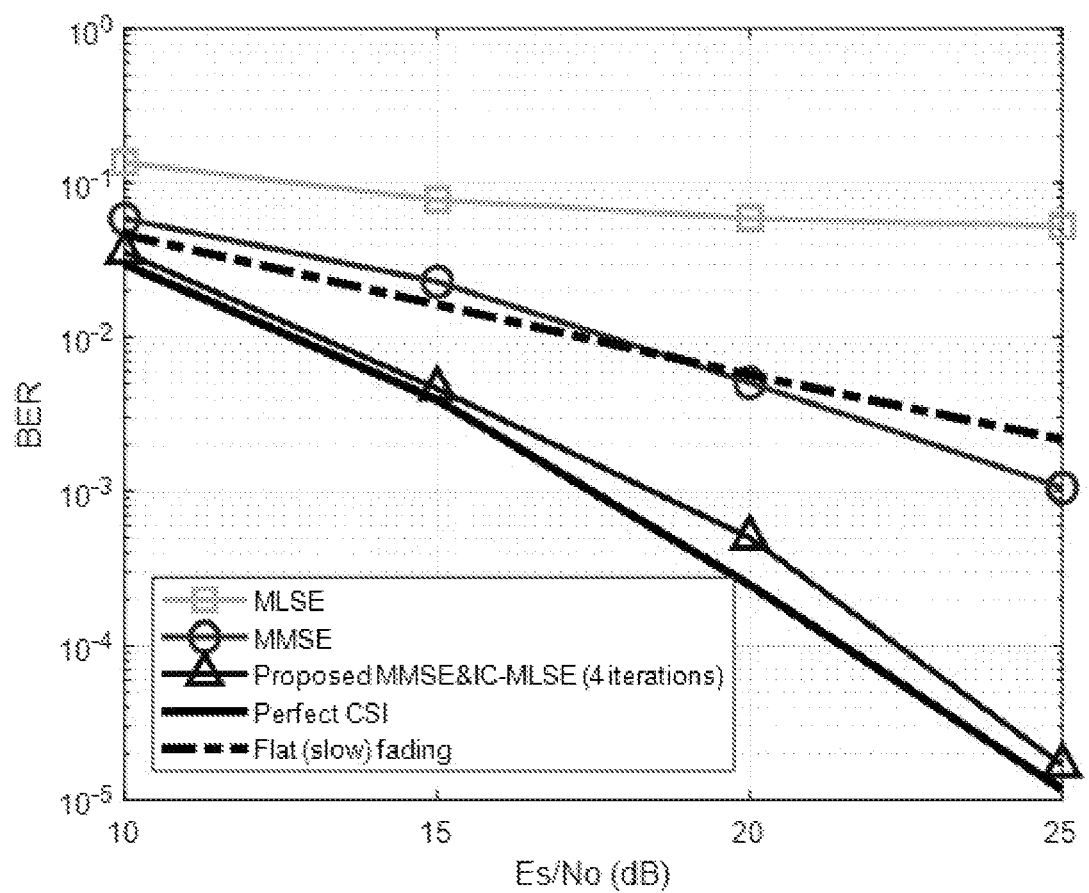
FIG. 16A depicts a plot of the BER after equalization without FEC, according to various example embodiments of the present invention.
Figure 16B:
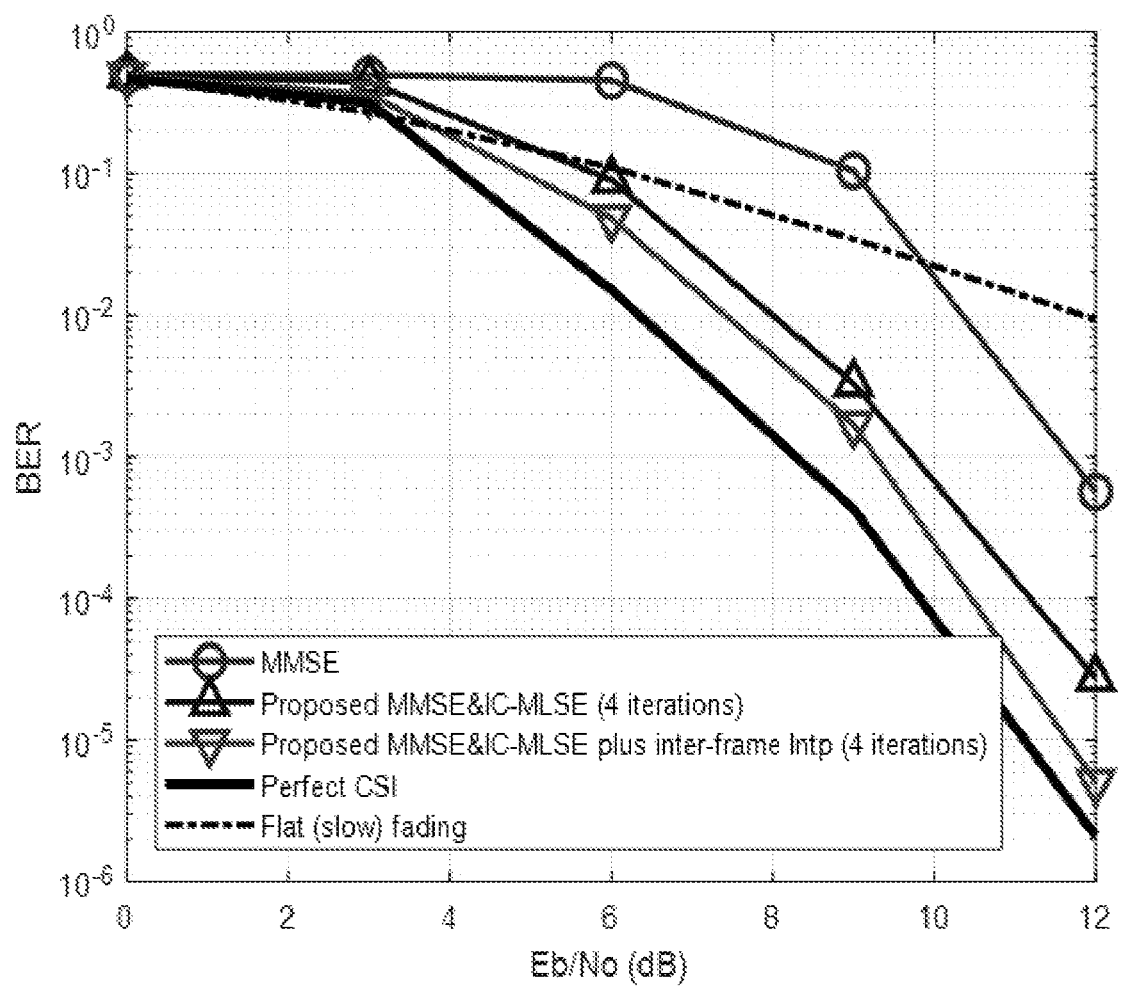
FIG. 16B depicts a plot of the BER after equalization with FEC, according to various example embodiments of the present invention.

The MSE of the channel estimation and BER obtained by different equalization methods are shown in FIGS. 15A, 15B, 16A and 16B, respectively. Results shown in FIGS. 15A and 16A are obtained without FEC. In particular, FIG. 15A depicts a plot of the MSE of the channel estimation without FEC ($f_d T_s A1=0.62$, $f_c=20$ GHz, vehicle speed=500 km/h, efficiency=93%). FIG. 15B depicts a plot of the MSE of the channel estimation with FEC ($f_d T_s N=0.62$, $f_c=20$ GHz, vehicle speed=500 km/h, efficiency=93%). FIG. 16A depicts a plot of the BER after equalization without FEC ($f_d T_s N=0.62$, $f_c=20$ GHz, vehicle speed=500 km/h, efficiency=93%). FIG. 16B depicts a plot of the BER after equalization with FEC ($f_d T_s N=0.62$, $f_c=20$ GHz, vehicle speed=500 km/h, efficiency=93%). Results shown in FIGS. 15B and 16B are obtained with FEC. The FEC code was a rate ½ convolutional code with generator polynomial (133, 171) and the interleaver was a random interleaver with length of 5120 bits. For the MLSE disclosed in the above-mentioned Barhumi reference, K=N was used since Equation (9) is only valid when K=N. The BERs obtained under flat fading channel are also shown in FIGS. 16A and 16B for benchmark.

From FIGS. 15A, 15B, 16A and 16B, it can be observed that the method according to various example embodiments leads to much better MSE and BER performance than those achieved by conventional MLSE and MMSE methods. The reason that the MSE and BER obtained by MLSE proposed in the above-mentioned Barhumi reference are not good is that using K=N and $$\omega_q = \frac{2\pi}{K}\left(q - \left[\frac{Q}{2}\right]\right),$$

$q \in \{0,1,\ldots,Q\}$ leads to a poor BEM channel model for the actual channel with large Doppler spread, and therefore, there are large channel modelling error, which leads to high MSE and BER. The method according to various example embodiments also performs better than the MMSE disclosed in the above-mentioned Tang reference because MMSE is sub-optimum in performance as compared with MLSE, and in addition, the method according to various example embodiments achieves further improvement by using iterations.

From FIGS. 15B and 16B, it can also be observed that by adding inter-frame channel interpolation, further performance improvement can be obtained, and the BER after adding inter-frame channel interpolation get very close to the BER obtained with perfect CSI.

Accordingly, various example embodiments provide a hybrid iterative channel estimation and equalization method (MMSE&IC-MLSE) for efficient and accurate channel estimation (CE) and data equalization for OFDM transmission over a DSC without excessive pilot symbol transmission. In a first iteration or round, the method uses MMSE to perform equalization, and in subsequent iteration(s) or round(s), the method uses the MLSE together with an interference cancellation (IC) block to perform equalization. The method works without and with FEC. Simulation results show that the method significantly outperforms the conventional pilot-based iterative CE and equalization methods for both without and with FEC scenarios, especially when the Doppler spread of the channel is high.

Moreover, unlike equal or fixed power allocation in conventional iterative schemes, various example embodiments allocate the transmission power differently over the data and the pilot symbols in an optimal way in the method to further improve the system MSE/BER performance.

Furthermore, to further improve the performance of the proposed scheme, for continuous transmission of data blocks, various example embodiments use inter-frame channel interpolation based on LS fitting method to reduce the MSE of CE at the transmission block edges. Simulation results show that the overall performance of the CE and BER can be improved by using the method according to various example embodiments of the present invention.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of receiving a transmitted signal over a time-varying channel, the method comprising:
   obtaining a received symbol signal in frequency domain based on the transmitted signal;
   performing a first channel estimation with respect to the time-varying channel based on the received symbol signal to obtain a plurality of first estimated basis expansion model (BEM) coefficients, the time-varying channel being modeled based on a complex-exponential basis expansion model (CX-BEM);

performing a first equalization based on the received symbol signal and the plurality of first estimated BEM coefficients to obtain a plurality of first detected source symbols; and performing one or more rounds of a second channel estimation and a second equalization, each round comprising:

performing the second channel estimation with respect to the time-varying channel based on the received symbol signal and a plurality of detected source symbols to obtain a plurality of second estimated BEM coefficients;

performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols.

2. The method according to claim 1, further comprising determining a first estimated channel matrix based on the plurality of first estimated BEM coefficients, wherein the first equalization is performed based on the received symbol signal and the first estimated channel matrix to obtain the plurality of first detected source symbols.

3. The method according to claim 2, wherein said performing interference removal comprises:

determining a second estimated channel matrix based on the plurality of second estimated BEM coefficients; and decomposing the second estimated channel matrix into an estimated banded diagonal channel matrix and a complementary channel matrix of the estimated banded diagonal channel matrix.

4. The method according to claim 3, wherein said performing interference removal further comprises removing interference in the received symbol signal based on the complementary channel matrix and the plurality of detected source symbols to obtain the interference reduced symbol signal.

5. The method according to claim 4, wherein the interference comprises inter-carrier interference associated with non-significant subcarriers in the received symbol signal.

6. The method according to claim 1, wherein in a first round of the one or more rounds, the plurality of detected source symbols are the plurality of first detected source symbols.

7. The method according to claim 6, wherein the one or more rounds is a plurality of rounds; and in each subsequent round of the plurality of rounds subsequent to the first round, the plurality of detected source symbols are the plurality of second detected source symbols obtained at the immediately preceding round of the plurality of rounds.

8. The method according to claim 1, wherein the received symbol signal is encoded based on an error correction code, the plurality of first detected source symbols are a plurality of first detected coded source symbols, and the method further comprises:

demapping and deinterleaving the plurality of first detected coded source symbols to obtain a plurality of first detected coded bits;

soft decoding the plurality of first detected coded bits to obtain a plurality of first soft coded bits;

hard decoding the plurality of first detected coded bits to obtain a plurality of first hard coded bits;

interleaving and mapping the plurality of first soft coded bits to obtain a plurality of first detected soft decoded source symbols; and interleaving and mapping the plurality of first hard coded bits to obtain a plurality of first detected hard decoded source symbols.

9. The method according to claim 8, wherein the plurality of second detected source symbols are a plurality of second detected coded source symbols, the method further comprises:

demapping and deinterleaving the plurality of second detected coded source symbols to obtain a plurality of second detected coded bits;

soft decoding the plurality of second detected coded bits to obtain a plurality of second soft coded bits;

hard decoding the plurality of second detected coded bits to obtain a plurality of second hard coded bits;

interleaving and mapping the plurality of second soft coded bits to obtain a plurality of second detected soft decoded source symbols; and interleaving and mapping the plurality of second hard coded bits to obtain a plurality of second detected hard decoded source symbols.

10. The method according to claim 9, wherein in a first round of the one or more rounds, the plurality of detected source symbols are the plurality of first detected hard decoded source symbols.

11. The method according to claim 10, wherein in the first round of the one or more rounds, the second equalization is performed further based on the plurality of first detected soft decoded source symbols.

12. The method according to claim 10, wherein the one or more rounds is a plurality of rounds; and in each subsequent round of the plurality of rounds subsequent to the first round, the plurality of detected source symbols are the plurality of second detected hard decoded source symbols obtained at the immediately preceding round of the plurality of rounds.

13. The method according to claim 12, wherein in said each subsequent round of the plurality of rounds, the second equalization is performed further based on the plurality of second detected soft decoded source symbols.

14. The method according to claim 1, wherein the received symbol signal comprises a plurality of frames, and the method further comprises performing, for each of the plurality of frames, inter-frame channel interpolation of estimated channel gains in the frame.

15. The method according to claim 14, wherein said inter-frame channel interpolation comprises:

determining an inter-frame channel interpolation polynomial function based on estimated channel gains in a middle portion of the frame; and modifying estimated channel gains in at least one of a beginning portion and an end portion of the frame based on the inter-frame channel interpolation polynomial function.

16. The method according to claim 1, wherein the transmitted signal is transmitted over the time-varying channel based on orthogonal frequency division multiplexing (OFDM) transmission.

17. The method according to claim 1, wherein the first channel estimation is based on a pilot-aided channel estimation, the first equalization is based on a minimum mean-square error (MMSE) equalization, the second channel estimation is based on a data-aided channel estimation, and the second equalization is based on a maximum likelihood sequence estimation (MLSE) equalization.

18. The method according to claim 1, wherein said obtaining the received symbol signal comprises performing a discrete Fourier transform (DFT) based on the transmitted signal.

19. A receiver for receiving a transmitted signal over a time-varying channel, the receiver comprising:

a memory; and at least one processor communicatively coupled to the memory and configured to perform a method of receiving the transmitted signal over the time-varying channel, the method comprising:

obtaining a received symbol signal in frequency domain based on the transmitted signal;

performing a first channel estimation with respect to the time-varying channel based on the received symbol signal to obtain a plurality of first estimated basis expansion model (BEM) coefficients, the time-varying channel being modeled based on a complex-exponential basis expansion model (CX-BEM);

performing a first equalization based on the received symbol signal and the plurality of first estimated BEM coefficients to obtain a plurality of first detected source symbols; and performing one or more rounds of a second channel estimation and a second equalization, each round comprising:

performing the second channel estimation with respect to the time-varying channel based on the received symbol signal and a plurality of detected source symbols to obtain a plurality of second estimated BEM coefficients;

performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols.

20. A computer program product, embodied in one or more non-transitory computer-readable storage mediums, comprising instructions executable by at least one processor to perform a method of receiving a transmitted signal over a time-varying channel, the method comprising:

obtaining a received symbol signal in frequency domain based on the transmitted signal;

performing a first channel estimation with respect to the time-varying channel based on the received symbol signal to obtain a plurality of first estimated basis expansion model (BEM) coefficients, the time-varying channel being modeled based on a complex-exponential basis expansion model (CX-BEM);

performing a first equalization based on the received symbol signal and the plurality of first estimated BEM coefficients to obtain a plurality of first detected source symbols; and performing one or more rounds of a second channel estimation and a second equalization, each round comprising:

performing the second channel estimation with respect to the time-varying channel based on the received symbol signal and a plurality of detected source symbols to obtain a plurality of second estimated BEM coefficients;

performing interference removal based on the received symbol signal, the plurality of detected source symbols and the plurality of second estimated BEM coefficients to obtain an interference reduced symbol signal in frequency domain; and performing the second equalization based on the interference reduced symbol signal and the plurality of second estimated BEM coefficients to obtain a plurality of second detected source symbols.

* * * * *